(12) United States Patent
Maki

(10) Patent No.: US 11,265,821 B2
(45) Date of Patent: Mar. 1, 2022

(54) COMMUNICATION SYSTEM

(71) Applicant: DENSO CORPORATION, Kariya (JP)

(72) Inventor: Daisuke Maki, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/102,875

(22) Filed: Nov. 24, 2020

(65) Prior Publication Data

US 2021/0168729 A1 Jun. 3, 2021

(30) Foreign Application Priority Data

Nov. 28, 2019 (JP) .............................. JP2019-215242

(51) Int. Cl.
H04W 52/30 (2009.01)
H04W 52/24 (2009.01)

(52) U.S. Cl.
CPC ......... H04W 52/241 (2013.01); H04W 52/30 (2013.01)

(58) Field of Classification Search
CPC ... H04W 52/241; H04W 52/30; H04W 52/24; Y02B 90/20; Y04S 40/26
USPC .................................................. 455/522, 69
See application file for complete search history.

(56) References Cited

U.S. PATENT DOCUMENTS

| | | | | |
|---|---|---|---|---|
| 9,325,368 B2* | 4/2016 | Serizawa | ............ | H04B 7/2656 |
| 10,993,231 B2* | 4/2021 | Yeo | ........................ | H04W 74/02 |
| 2014/0170511 A1* | 6/2014 | Tolmachev | ........... | H01M 8/188 |
| | | | | 429/418 |
| 2015/0112577 A1* | 4/2015 | Velusamy | ........... | F02D 41/2422 |
| | | | | 701/110 |
| 2015/0266386 A1* | 9/2015 | Matsuda | ................. | B60L 53/14 |
| | | | | 318/139 |
| 2016/0114695 A1* | 4/2016 | Holgers | ................ | B60L 3/0046 |
| | | | | 701/22 |
| 2016/0264013 A1* | 9/2016 | Kim | ......................... | B60L 53/63 |
| 2017/0259802 A1* | 9/2017 | Kato | ..................... | B60W 10/26 |
| 2018/0022301 A1* | 1/2018 | Li | ........................ | H01M 10/052 |
| | | | | 307/9.1 |
| 2018/0178776 A1* | 6/2018 | Kuwahara | ................ | B60K 6/48 |
| 2019/0084554 A1* | 3/2019 | Yamamoto | ............ | B60W 20/10 |
| 2019/0092104 A1* | 3/2019 | Ahmed | ............... | B60C 23/0459 |

(Continued)

FOREIGN PATENT DOCUMENTS

| | | | | |
|---|---|---|---|---|
| JP | 2016-12954 A | | 1/2016 | |
| JP | 2016012954 | * | 1/2016 | ............ H04W 24/10 |

*Primary Examiner* — Hai V Nguyen
(74) *Attorney, Agent, or Firm* — Posz Law Group, PLC

(57) ABSTRACT

A communication system includes a variable device, which is one of a management device and a terminal device, having a power determination unit and a transmission instruction unit. State information indicates a state of a housing that houses the communication system. A power determination unit is configured to determine a transmission power value as an applicable power value for a transmission of a wireless communication signal to a target device to achieve a predetermined communication quality when the state of the housing has changed based on the state information. The target device, which is the other of the management device and the terminal device, is a device with which the variable device communicates. A transmission instruction unit instructs a wireless communication device in the variable device to transmit the wireless communication signal to the target device at the applicable power value.

11 Claims, 19 Drawing Sheets

(56) References Cited

U.S. PATENT DOCUMENTS

| | | | | |
|---|---|---|---|---|
| 2019/0143831 A1* | 5/2019 | Birek | ............ | B60L 3/12 |
| | | | | 701/22 |
| 2019/0143832 A1* | 5/2019 | Birek | ............ | B60L 53/14 |
| | | | | 701/22 |
| 2019/0152327 A1* | 5/2019 | Choi | ............ | G07F 15/008 |
| 2020/0092685 A1* | 3/2020 | Fehrenbach | ......... | H04B 7/2606 |
| 2020/0164763 A1* | 5/2020 | Holme | ............ | B60L 58/10 |
| 2021/0139014 A1* | 5/2021 | Zhao | ............ | B60W 20/12 |
| 2021/0221250 A1* | 7/2021 | Hiratsuka | ............ | B60L 58/22 |

* cited by examiner

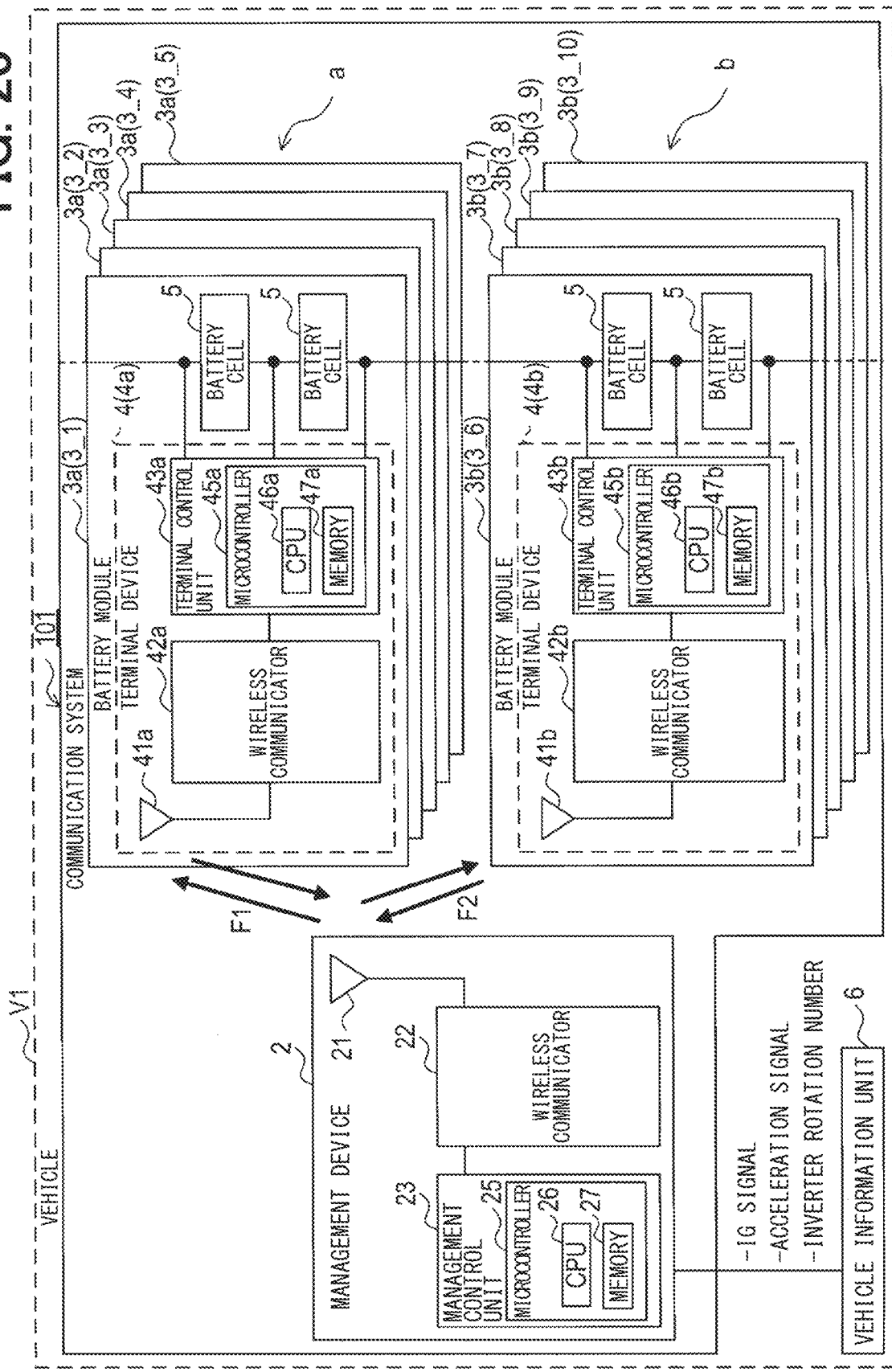

COMMUNICATION SYSTEM

CROSS REFERENCE TO RELATED APPLICATION

The present application is based on and claims the benefit of priority of Japanese Patent Application No. 2019-215242, filed on Nov. 28, 2019, the disclosure of which is incorporated herein by reference.

BACKGROUND INFORMATION

The present disclosure generally relates to a communication system including at least one terminal device that obtains information about a battery and at least one management device that communicates with the terminal device.

SUMMARY

It is, in one aspect, an object of the present disclosure to provide a technique for suppressing deterioration of communication quality in a communication system.

BRIEF DESCRIPTION OF THE DRAWINGS

Objects, features, and advantages of the present disclosure will become more apparent from the following detailed description made with reference to the accompanying drawings, in which:

FIG. 20 is a diagram of an example in which a communication system performs communication using a plurality of frequency bands in the other embodiments.

DETAILED DESCRIPTION

Hereinafter, exemplary embodiments of the present disclosure will be described with reference to the drawings.

First Embodiment

1-1. Configuration

<Overall Structure>

A configuration of a communication system 100 according to the present embodiment is described with reference to FIGS. 1 and 2. The communication system 100 is mounted on a vehicle V1. The communication system 100 includes at least one management device 2 and at least one terminal device 4. The communication system 100 may include a vehicle information unit 6.

The vehicle information unit 6 includes a plurality of in-vehicle sensors and in-vehicle devices that detect a state of the vehicle V1. More specifically, the vehicle information unit 6 may include a wheel speed sensor, an acceleration sensor, and the like. In addition, the vehicle information unit 6 may include an electronic control device or the like that detects the rotation number/number of an inverter included in the vehicle V1.

Figure 1:
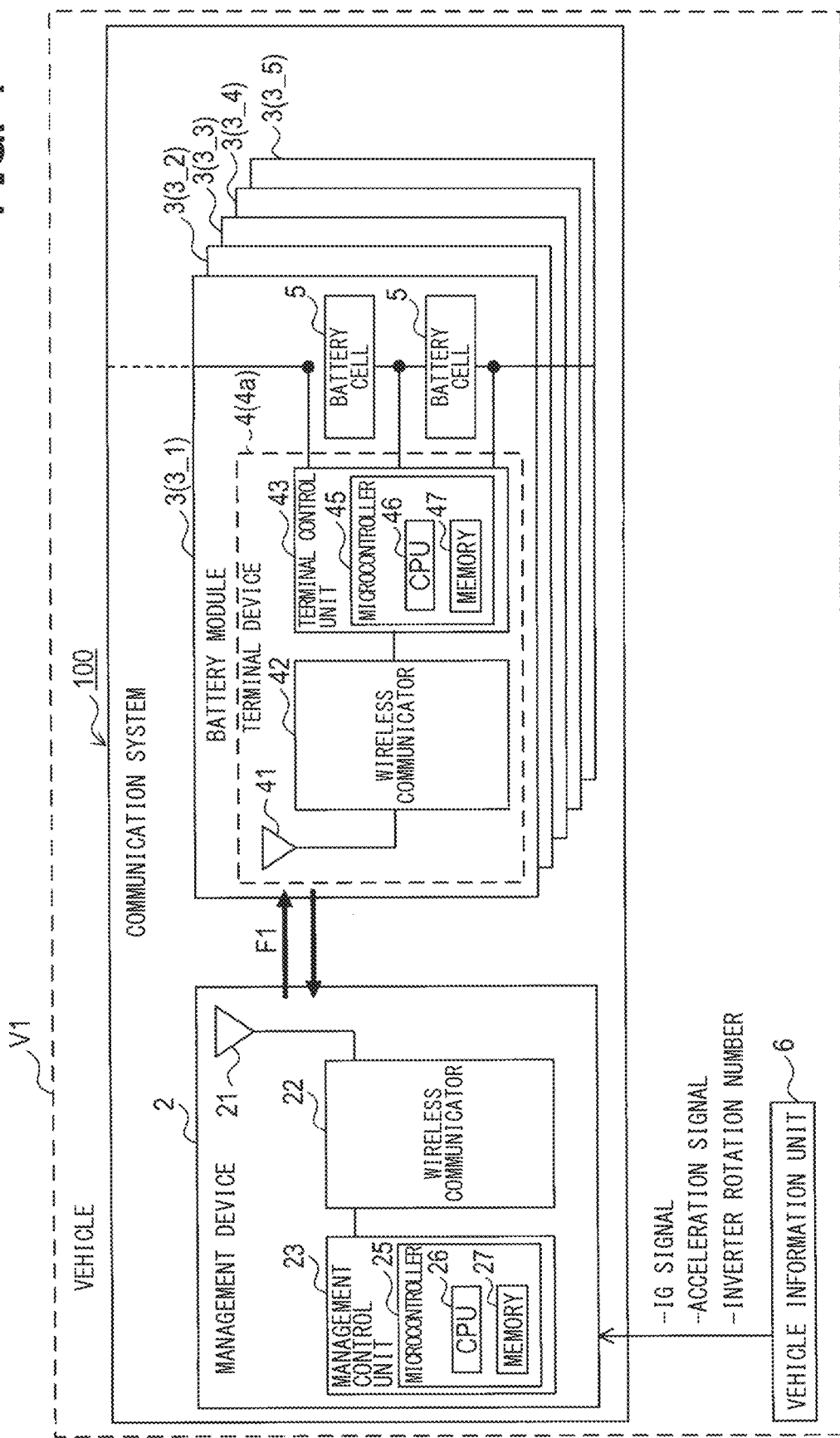
FIG. 1 is a block diagram of a configuration of a communication system.
Figure 2:
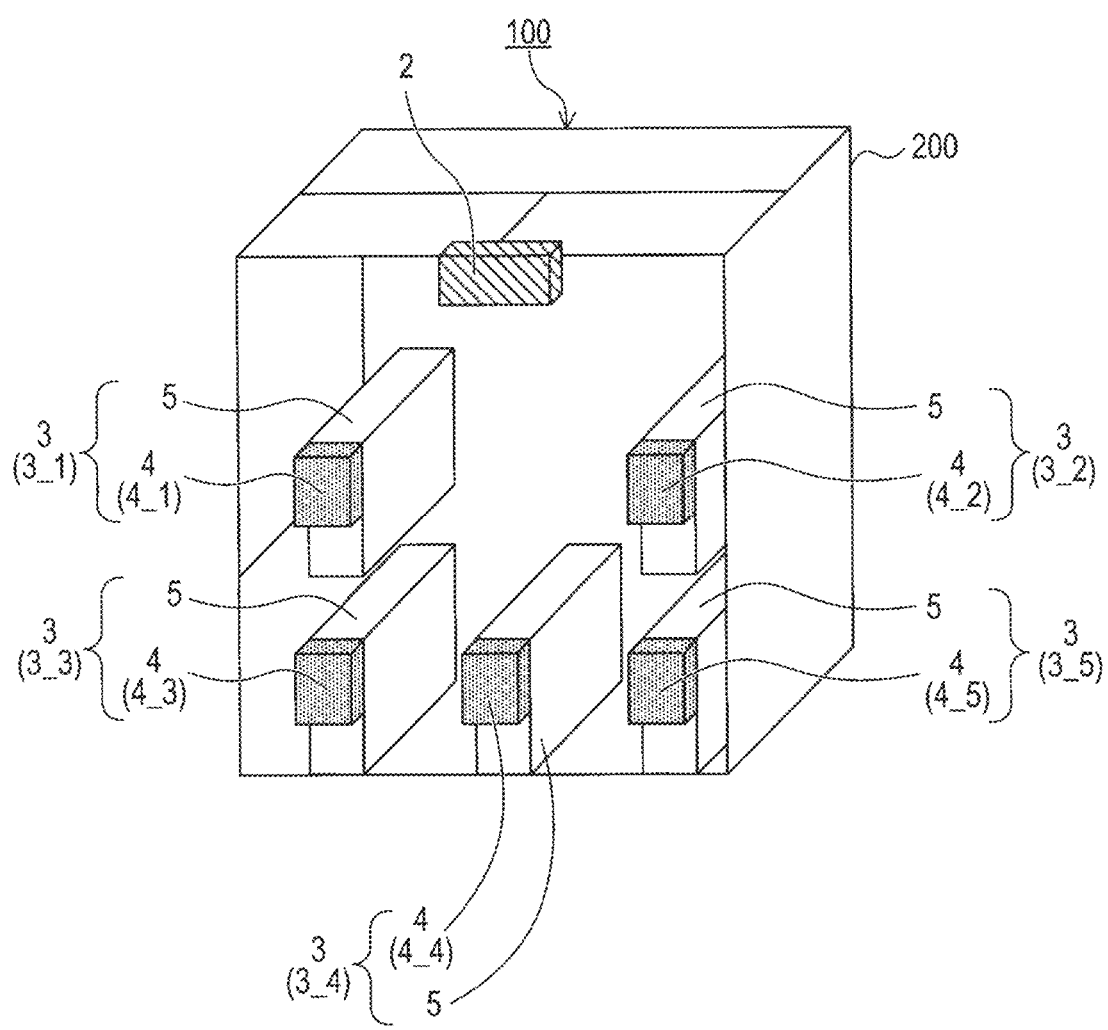
FIG. 2 is a schematic diagram of a configuration of the communication system.

In the present embodiment shown in FIGS. 1 and 2, the communication system 100 includes one management device 2 and a plurality of battery modules 3. The plurality of battery modules 3 are battery modules 3_1 to 3_5, for example.

The battery modules 3_1 to 3_5 are similarly configured. One battery module 3 includes one terminal device 4 and at least one battery cell 5. That is, the communication system 100 shown in FIGS. 1 and 2 includes one management device 2 and a plurality (e.g., 5 in FIG. 2) of terminal devices 4_1 to 4_5. However, the number of management devices 2 and the number of terminal devices 4 included in the communication system 100 are not limited to the above.

The management device 2 performs wireless communication with the terminal device 4. The terminal device 4 obtains battery information from the battery cell 5 and performs wireless communication with the management device 2. The battery information means information about the state of the battery cell 5. For example, a voltage of the battery cell 5 may be the battery information.

In the following, individual constituent elements of the plurality of constituent elements included in the communication system 100 may be represented by adding subscripts to the symbols, such as a battery module 3_1 and a terminal device 4_1. In addition, when describing components collectively, a suffix may be abbreviate/omitted and only a numeral is described like a battery module 3 and the terminal device 4, for example.

The management device 2 and the plurality of battery modules 3 included in the communication system 100 are arranged, for example, as shown in FIG. 2 in a metal housing 200 installed in the vehicle V1. The management device 2 and the plurality of battery modules 3 may be arbitrarily arranged in the housing 200.

In FIGS. 1 and 2, the battery module 3 includes the plurality of battery cells 5, but the battery module 3 may include only one battery cell 5. The number of battery cells 5 included in each of the plurality of battery modules 3 may be different for each battery module 3. When the battery module 3 includes a plurality of battery cells 5, the plurality of battery cells 5 may be connected in series with each other as shown in FIG. 1, or may be connected in parallel although not shown, or they may also be connected in series and parallel.

Further, the housing 200 is not limited to being made of metal. For example, the housing 200 may be made of resin, may be made of both metal and resin, or may be made of material other than metal and resin. Although the housing 200 is shown as having a box shape in FIG. 2, the shape of the housing 200 is not limited to such shape. For example, the housing 200 has a shape in which the communication system 100 can be arranged inside, and may have any shape other than a box shape. Further, for example, the housing 200 may or may not have a radio wave shielding effect. For example, the housing 200 may be the outer shell of the vehicle V1 itself. The housing 200 may not be hermetically sealed.

<Management Device 2>

Returning to FIG. 1, the explanation is continued. The management device 2 includes an antenna 21, a wireless communicator 22, and a management control unit 23.

<Wireless Communicator 22>

The wireless communicator 22 transmits and receives a wireless communication signal of a predetermined first frequency band F1 used in the communication system 100 to and from the terminal device 4 provided in each of the plurality of battery modules 3 via the antenna 21. The wireless communication signal refers to a signal used for wireless communication (that is, a radio wave). The antenna 21 may be an antenna that transmits/receives the wireless communication signal of the first frequency band F1 used in the communication system 100. The first frequency band F1 may be, for example, the high UHF band (that is, several GHz).

The wireless communicator 22 transmits and receives wireless communication signals according to a predetermined communication standard. Examples of the predetermined communication standard include WiFi (registered trademark), Bluetooth (registered trademark), and Bluetooth Low Energy. Moreover, the wireless communicator 22 may be a device to which a standard using UWB is applied. UWB is an abbreviation for Ultra Wide Band. Moreover, the wireless communicator 22 may be a device to which a standard of another frequency band is applied.

Although not shown, the wireless communicator 22 may include a detection device that detects the reception intensity of the reception signal and outputs the detection result.

<Management Control Unit 23>

The management control unit 23 includes a microcomputer or microcontroller 25 including a CPU 26, a ROM, a RAM, and a semiconductor memory such as a flash memory (hereinafter, a memory 27). The management control unit 23 realizes each function shown in FIG. 3 by the CPU 26 executing a program stored in a non-transitory, tangible recording medium. The memory 27 may be a non-transitory, tangible recording medium that stores a computer program. Further, by executing the computer program, a method corresponding to the computer program is performed.

Figure 3:
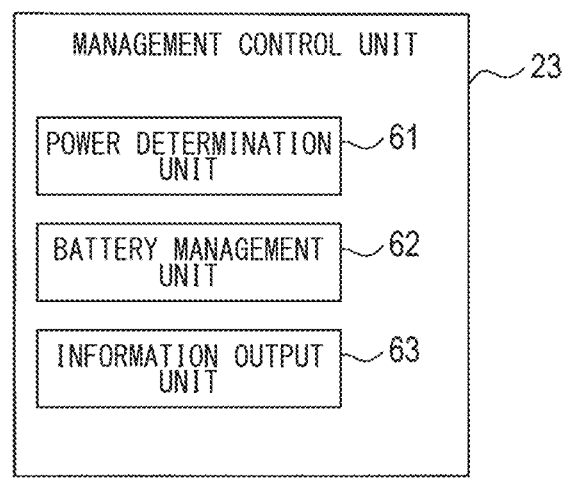
FIG. 3 is a block diagram of functions of a management device.

As shown in FIG. 3, the management control unit 23 has the functions of a power determination unit 61, a battery management unit 62, and an information output unit 63. The power determination unit 61 obtains at least one state information, and determines whether a state of the housing 200 has changed based on the obtained state information. Then, when it is determined that the state of the housing 200 has changed, the power determination unit 61 determines a transmission power value of the wireless communication signal transmitted to a target device as an applicable power value. As a result, the wireless communication signal is transmitted to the target device at the applicable power value.

The state information is information indicating a state of the housing 200. The housing 200 includes the communication system 100 in an inside thereof as described above. The state of the housing 200 may include (i) a shape of the housing 200, (ii) operation of the housing 200, (iii) an environment in which the housing 200 is placed, (iv) a situation in which the housing 200 is put (for example, time, timing, etc.).

For example, the state information may include information indicating a specific state. The specific state is a predetermined state. The specific state may include/indicate a predetermined timing. In the present embodiment in which the housing 200 is mounted on the vehicle V1, a state in which an ignition switch of the vehicle V1 is turned ON may be included as the specific state, for example.

The state information may be information that quantitatively indicates a state of the housing 200. "Quantitatively indicated" means numerically indicated. For example, the state information may be information that quantitatively indicates a vibration of the housing 200. In the present embodiment in which the housing 200 is mounted on the vehicle V1, the state information may be an acceleration of the vehicle V1, for example. Further, the state information may be a rotation number of the inverter included in the vehicle V1.

Further, the state information may be information indicating that the housing 200 has changed with time. For example, the state information may be elapsed time after a certain timing. More specifically, the state information may be a post-determination elapsed time. The post-determination elapsed time is an elapsed time after an applicable power value is most recently determined, which is described later. The "recently" refers to a past just before a current moment.

The target device is one of the management device 2 and the terminal device 4 included in the communication system 100, when the other of the two is considered/designated as a variable device, which may also be designated as a target of communication from the variable device. That is, when the management device 2 is designated as a variable device in the present embodiment, the target device is a terminal device 4 to be communicated with by the management device 2 (i.e., a variable device) from among the plurality of terminal devices 4. More specifically, in the present embodiment including the terminal devices 4_1 to 4_5, each of the terminal devices 4_1 to 4_5 can be a target device in order.

The applicable power value is a transmission power value of a wireless communication signal between the variable device and the target device, and a transmission power value that realizes a predetermined communication quality. The communication quality here is a quality of wireless communication between the variable device and the target device. The information indicating a communication quality is designated as BER. BER is an abbreviation for Bit Error Rate. However, the present disclosure is not limited to such configuration. The information indicating a communication quality may be a throughput. Further, as described later, information indicating a communication quality may be a reception intensity of the wireless communication signal (that is, a test signal described later) transmitted from the management device 2 serving as the variable device.

A change in the state of the housing 200 means that the housing 200 itself and the inside of the housing 200 are changed/have been changed due to changes in the situation in which the housing 200 is put, changes along the lapse of time, and/or changes of other external factors such as vibrations, shocks and the like have occurred. When the state of the housing 200 changes, a distribution state of intensity of the electromagnetic field in the housing 200 changes. That is, that a change in the state of the housing 200 is caused means that some kind of change has occurred to change of a distribution state of intensity of the electromagnetic field in the housing 200.

The power determination unit 61 performs a power determination process described later to realize these functions. The battery management unit 62 uses the wireless communicator 22 to perform wireless communication with the terminal device 4 that is a target device, causes the terminal device 4 to transmit the battery information obtained by the terminal device 4, and stores the battery information in the memory 27. The battery management unit 62 manages the state of the battery cell 5 in such manner. In the present embodiment, as described above, a voltage of the battery cell 5 is obtained as the battery information. However, the battery information is not limited to such, and the battery information may be various information about a battery cell 5, such as temperature of the battery cell 5 and the like. The battery management unit 62 implements these functions by performing a management process described later.

The information output unit 63 outputs the battery information stored in the memory 27 to an external device of the communication system 100. The external device may be, for example, an electronic control device included in the vehicle V1. Device information is stored in the memory 27. The device information is information of correspondence/association between (i) identification information for identifying each of the plurality of terminal devices 4 and (ii) a frequency band used by each of the plurality of terminal devices 4 for wireless communication with the management device 2 (a frequency band F1 in the present embodiment).

<Terminal Device 4>

Description of FIG. 1 continues. The terminal devices 4 are similarly configured. One terminal device 4 includes an antenna 41, a wireless communicator 42, and a terminal control unit 43.

<Wireless Communicator 42>

The wireless communicator 42 transmits and receives a wireless communication signal using the first frequency band F1 to/from the management device 2 included in the communication system 100 via the antenna 41. The antenna 41 may be an antenna that transmits and receives a wireless communication signal of the first frequency band F1 used in the communication system 100. The wireless communicator 42 can be configured similarly to the wireless communicator 22.

<Terminal Control Unit 43>

The terminal control unit 43 includes a microcomputer/microcontroller including a CPU 46 and a memory 47. The terminal control unit 43 realizes each function shown in FIG. 4 by the CPU 46 executing a program stored in the non-transitory, tangible recording medium. The memory 47 may be a non-transitory, tangible recording medium that stores a computer program. Further, by executing the computer program, a method corresponding to the computer program is performed.

Figure 4:
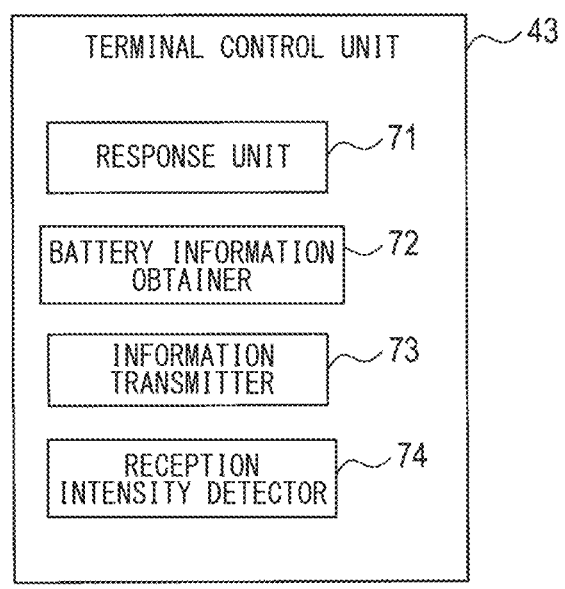
FIG. 4 is a block diagram of functions of a terminal device.

As shown in FIG. 4, the terminal control unit 43 has functions of a response unit 71, a battery information obtainer 72, and an information transmitter 73. The terminal control unit 43 may have the function of a reception intensity detector 74.

When receiving a wireless communication signal (for example, a test signal described later) from the variable device (that is, the management device 2 in the present embodiment), the response unit 71 determines a communication index of the received wireless communication signal. In addition, the response unit 71 transmits a wireless communication signal including reception information (for example, a test response signal described later) to the variable device. The reception information is information including at least a determined communication index. The communication index represents a communication quality of the wireless communication signal transmitted from the variable device to the target device (i.e., the terminal device 4 in the present embodiment).

The response unit 71 performs a power response process described later to realize those functions. The battery information obtainer 72 obtains battery information from the battery cells 5 in a predetermined cycle (hereinafter, information obtaining cycle), and stores the obtained battery information in the memory 47. Here, voltage values at both ends (i.e., terminals) of the battery cell is obtained as the battery information, as described above. The information obtaining cycle may be shorter than a management cycle described later.

The information transmitter 73 uses the wireless communicator 42 to perform wireless communication according to a transmission instruction signal transmitted from the management device 2 in a predetermined cycle (hereinafter, a management cycle), and transmits the battery information to the management device 2. The information transmitter 73 performs an information transmission process described later to realize those functions.

The reception intensity detector 74 detects a reception intensity of the wireless communication signal every time the wireless communicator 42 receives a wireless communication signal from the variable device (i.e., from the management device 2 in the present embodiment), and information indicating the detected reception intensity is stored in the memory 47.

1-2. Process

<Power Determination Process and Power Response Process>

The power determination process performed by the power determination unit 61 of the management control unit 23 and the power response process performed by the response unit 71 of the terminal control unit 43 is described with reference to a flowchart shown in FIG. 5.

The management control unit 23 repeats the power determination process in a predetermined cycle. The management control unit 23 obtains the state information in S110. In the present embodiment, an IG signal and the post-determination elapsed time are obtained as state information. The IG signal is a signal indicating whether or not an ignition switch (IG switch) is turned ON. The post-determination elapsed time is an elapsed time since the applicable power value was determined immediately before. The management control unit 23 measures the post-determination elapsed time in a process different from the power determination process.

In S115-S120, the management control unit 23 determines whether or not the state of the housing 200 has changed, based on the state information. First, in S115, the management control unit 23 determines whether or not it is in a specific state. The specific state in the present embodiment means a state in which the ignition switch is being turned ON. The management control unit 23 shifts the process to S125 when not in the specific state, and shifts the process to S120 when in the specific state.

In S120, subsequently, the management control unit 23 determines whether or not the state of the housing 200 has changed, based on a comparison between the quantitatively indicated state information and a predetermined state threshold value. That is, the state threshold value is used to establish/determine a difference between (i) a situation in which the state of the housing 200 has changed and (ii) a situation in which the state of the housing 200 has not changed, and the quantitatively indicated state information in the present embodiment means the state information indicative of a post-determination elapsed time. The management control unit 23 determines that the state of the housing 200 has changed when the post-determination elapsed time becomes equal to or greater than the state threshold value, i.e., a threshold time value.

The threshold time value is a predetermined time, and may be set to an amount of time allowed for the transmission power value of the management device 2 to be kept unchanged/un-updated from a current applicable power value after the determination described above. In other words, the threshold time value defines a delay time of update of the transmission power value to a new applicable power value.

The threshold time value is stored in advance in the memory 27. The management control unit 23 shifts the process to S125 when the post-determination elapsed time is less than the threshold time value, and shifts the process to S130 when the post-determination elapsed time is equal to or greater than the threshold time value.

That is, in the present embodiment, it is determined that the state of the housing 200 has changed when the ignition switch is turned ON and the post-determination elapsed time is long. The management control unit 23 sets, in S125 to which the process shifts when it is determined that the state of the housing 200 has not changed, the applicable power value of each of the plural terminal devices 4 to a value "currently" or "at that moment" stored in the memory 27, and ends the process.

In S130, the management control unit 23 selects one of the plurality of terminal devices 4 included in the communication system 100. In the following, the selected terminal device 4 is described as a terminal device X4. Subsequently in S140-S155, the management control unit 23 transmits a test signal to the terminal device X4 serving as the target device with one of a plurality of predetermined selected power values. The selected power value is a predetermined power value and is a power value at the time of transmitting a test signal. Note that the test signal includes a test pattern that is a predetermined data string or series of data pieces. The target device is configured to determine a communication index of the test signal according to the received test signal, and to transmit reception information at least including the determined communication index to the variable device (i.e., to the management device 2).

The communication index quantitatively represents a communication quality, and is BER in the present embodiment. That is, the test signal is a signal transmitted from the variable device to the target device, and is a signal that causes the target device that has received the test signal to (i) determine a communication quality (i.e., BER) of the received test signal, and (ii) transmit the reception information at least including the determined communication quality. Note that the reception information may include identification information for identifying the target device, as well as a communication index indicating the communication quality of the received test signal.

In S140, the management control unit 23 selects one of a plurality of predetermined selected power values. The selected power value is a predetermined power value, which is a candidate power value for determining an output power value of the wireless communication signal to be transmitted to the target device. The plurality of selected power values are stored in the memory 27 in advance.

Subsequently in S145, the management control unit 23 uses the wireless communicator 22 to transmit a test signal to the terminal device X4 with the selected power value selected in S140. That is, in the present embodiment, the test signal is transmitted every time the state of the housing 200 changes.

Here, the terminal device X4 (i.e., the response unit 71 of the terminal control unit 43) starts the power response process triggered by the transmission of the test signal from the management device 2 serving as the variable device.

The terminal control unit 43 receives the test signal in S201. Subsequently in S202, the terminal control unit 43 determines a BER (Bit Error Rate) based on the received test signal. In the terminal device X4, the test pattern included in the test signal is stored in the memory 47 in advance. The terminal control unit 43 confirms a match between the test pattern included in the received test signal and the test pattern stored in the memory 47 in advance (i.e., a correct test pattern), and determines the BER.

The terminal control unit 43 generates the reception information in S203. The reception information is information including at least the BER determined in S202. The terminal control unit 43 uses the wireless communicator 42 to transmit a test response signal, which is a wireless communication signal including the reception information, to the management device 2. Then, the terminal device X4 ends the power response process.

On the other hand, in S150, the management control unit 23 receives the test response signal including the reception information from the terminal device X4 as serving the target device. The management control unit 23 stores the reception information in the memory 27.

Subsequently in S155, the management control unit 23 obtains the communication index (i.e., BER) included in the reception information transmitted from the terminal device X4 that is the target device, and determines, as an applicable power value, the selected power value to transmit a signal to the target device when the communication index is within a predetermined range. For example, the memory 27 stores a threshold index value in advance. The threshold index value is a numerical value for determining whether the communication index is within an allowable range. In the present embodiment in which the communication index is BER, the threshold index value is set to 10 powered by –n (for example, n is an integer of 1 or more).

The management control unit 23 determines that the communication index (i.e., BER) is appropriate when the BER is less than the threshold index value. Here, when it is determined that the communication index is not appropriate, the management control unit 23 shifts (i.e., returns) the process to S140, and repeats the process of S140-S155. That is, the management control unit 23 changes the (transmission) power value and transmits the test signal to the terminal device X4 until it is determined that the communication index is appropriate. That is, the management control unit 23 keeps changing the transmission power value until/for finding an appropriate power value/communication index.

On the other hand, when it is determined that the communication index is appropriate, the management control unit 23 shifts the process to S160.

In S160, the management control unit 23 determines, as an applicable power value, the selected power value selected in S140, which is used when the communication index is determined as appropriate. In S170, the management control unit 23 sets the applicable power value determined in S160 as an applicable power value of the terminal device X4. The management control unit 23 associates the terminal device X4 with the determined applicable power value, and stores both in the memory 27.

In S175, the management control unit 23 determines whether or not the process of determining the applicable power value for all of the terminal devices 4 included in the communication system 100 is complete. Here, the management control unit 23 shifts (i.e., returns) the process to S130 when the applicable power values have not been determined for all of the terminal devices 4, and repeats the process of S130 to S175. On the other hand, the management control unit 23 ends the present power determination process when the applicable power values are determined for all of the terminal devices 4.

<Management Process and Information Transmission Process>

Figure 6:
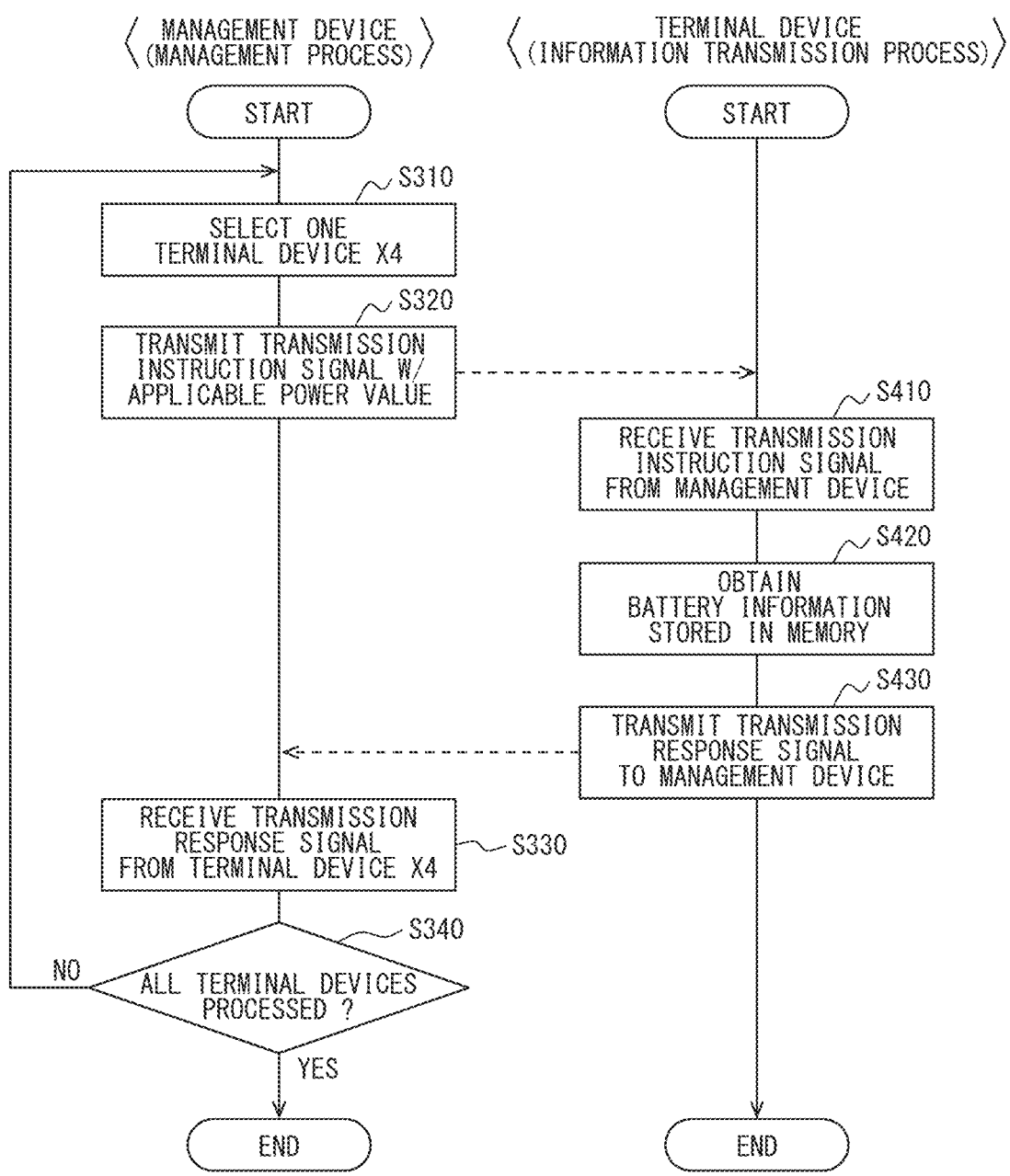
FIG. 6 is a flowchart of a management process performed by the management control unit and an information transmission process performed by the terminal control unit in the first embodiment.

The management process performed by the battery management unit 62 of the management control unit 23 and the information transmission process performed by the information transmitter 73 of the terminal control unit 43 is described with reference to a flowchart shown in FIG. 6.

The management control unit 23 repeats the management process in a predetermined cycle (i.e., at a management cycle). In S310, the management control unit 23 selects one of the plurality of terminal devices 4 included in the communication system 100. In the following, the selected terminal device 4 is described as a terminal device X4.

In S320, the management control unit 23 obtains the applicable power value stored in the memory 27 for the terminal device X4, and transmits the transmission instruction signal using the wireless communicator 22 with the applicable power value. The transmission instruction signal is a wireless communication signal including transmission instruction information. The transmission instruction information includes at least (i) information indicating an instruction to transmit the battery information and (ii) identification information for identifying a terminal device X4 that is a target for executing the instruction.

Then, the terminal device X4 (i.e., the response unit 71 of the terminal control unit 43) starts the information transmission process triggered by the transmission of the transmission instruction signal from the management device 2 serving as the variable device.

The terminal control unit 43 of the terminal device X4 first receives a transmission instruction signal from the management device 2 in S410. The terminal control unit 43 of the terminal device X4 obtains the battery information stored in the memory 47 in S420, subsequently. The battery information referred to here is the battery information most recently obtained by the battery information obtainer 72 and is the battery information stored in the memory 47.

The terminal control unit 43 of the terminal device X4 transmits the transmission response signal using the wireless communicator 42 in S430, subsequently. The transmission response signal is a wireless communication signal including at least the battery information obtained by the terminal device X4. In the present embodiment, the transmission response signal includes the battery information and the identification information for identifying the terminal device X4 that has obtained the battery information. Then, the terminal control unit 43 of the terminal device X4 ends the present information transmission process.

On the other hand, the management control unit 23 of the management device 2 receives the transmission response signal from the terminal device X4 in S330. As described above, in the present embodiment, the transmission response signal includes the battery information and the identification information of the terminal device X4 that has obtained the battery information (i.e., the terminal device 4 that has transmitted the transmission response signal). The management control unit 23 stores the battery information received from the terminal device X4 in the memory 27 in association with the identification information of the terminal device X4.

Subsequently in S340, the management control unit 23 determines whether the process of S310 to S330 has already been performed for all of the terminal devices 4 included in the communication system 100. That is, whether the transmission instruction signal has been transmitted to all terminal devices 4 for causing them to return/report the battery information, and the battery information from all terminal devices 4 has been stored in the memory 27 is determined.

Here, when it is determined that the above-described process has not yet been performed/complete for all of the terminal devices 4, the management control unit 23 shifts (i.e., returns) the process to S310. Then, the management control unit 23 repeats the process of S310-S340 for the remaining terminal devices 4.

On the other hand, when it is determined that the above process has been performed for all the terminal devices 4, the management control unit 23 ends the management process. At this point, the memory 27 stores the battery information obtained from all the terminal devices 4 included in the communication system 100. In the present embodiment, the identification information and the battery information are associated with each other and stored in the memory 27 for each of the plurality of terminal devices 4.

1-3. Effects

According to the first embodiment described in details above, the following effects are achievable. (1a) The variable device that is one of the management device 2 and the terminal device 4 includes the power determination unit 61 and the battery management unit 62 (i.e., the management device 2 is the variable device in the present embodiment). When it is determined that the state of the housing 200 has changed based on the obtained state information, the power determination unit 61 determines the transmission power value of the wireless communication signal transmitted to the target device (i.e., the terminal device 4), which is a communication target of the variable device, as the applicable power value that realizes a predetermined communication quality. The battery management unit 62 causes the wireless communicator 22 to transmit a wireless communication signal (i.e., a transmission instruction signal) to the target device with the applicable power value.

When the state of the housing 200 changes, the distribution state of intensity of the electromagnetic field inside the housing 200 may change due to, for example, vibration or a change of an object in the housing 200. The change of the object in the housing 200 may include a change in shape of the object due to aging, a change in arrangement/positioning, and the like. When the distribution state of intensity of the electromagnetic field in the housing 200 changes, the distribution of standing waves in the housing 200 changes.

Here, if the wireless communication device is located at a node of the distribution of the standing wave, the wireless communication device may be in a state where the communication quality may deteriorate due to a decrease in the reception level/intensity of the radio wave. On the other hand, if the wireless communication device is located on an antinode of the distribution of the standing wave, the wireless communication device may have a deteriorated communication quality due to saturation of the reception level of the radio wave. That is, if the state of the housing 200 changes, the communication quality may deteriorate.

In the present embodiment, when the state of the housing 200 changes, the transmission power value from one of the management device 2 and the terminal device 4 to the other is determined as an applicable power value, and transmission is performed with the applicable power value. Such a scheme described above may thus prevent/suppress deterioration of communication quality due to a change in the state of the housing 200.

As a result, in the present embodiment, the management device 2 can cause the terminal device 4 to receive the transmission instruction signal even when the state of the housing 200 changes or is changing, thereby enabling obtainment of the battery information transmitted therefrom during the change of the state of the housing 200. As a result, the management device 2 can continuously manage the state of the battery cell 5 regardless of whether the state of the housing 200 has changed.

(1b) The state information may be information indicating a specific state. The power determination unit 61 may be configured to determine that the state of the housing 200 has changed, at least when the obtained state information is information indicating the specific state. For example, by determining the specific state as a state in which the electromagnetic field intensity distribution in the housing 200 may possibly change, the applicable power value is determinable when or whenever the state in which the electromagnetic field intensity distribution may possibly change, i.e., is prone to external influences, for example.

(1c) The communication system 100 may be a system mounted on the vehicle V1. That is, in other words, the housing 200 may be a case of a battery pack mounted on the vehicle V1, and the battery cell 5 may be a rechargeable battery (for example, an assembled battery) used for the vehicle V1. The state information may be information indicating a state in which the ignition switch of the vehicle V1 is turned ON as a specific state. The power determination unit 61 may be configured to determine that the state of the housing 200 has changed, at least when the ignition switch of the vehicle V1 is in the specific state, i.e., when the IG switch is turned ON in the vehicle V1.

When the ignition switch is turned ON, various devices start operating, which may cause a change of the electromagnetic field intensity distribution in the vehicle V1 and may also cause a change thereof in the housing 200 in the vehicle V1. In the present embodiment, since the applicable power value is determined every time the ignition switch is turned ON, it is possible to suppress the deterioration of communication quality.

(1d) The state information may be information that quantitatively indicates the state of the housing 200. The power determination unit 61 may be configured to determine whether the state of the housing 200 has changed based on at least the comparison between the state information and the state threshold value. For example, the state threshold value may be appropriately/arbitrarily set to a value representing state information (i.e., a specific situation) when the electromagnetic field intensity distribution in the housing 200 can/may possibly change. Since it is numerically determined that the state of the housing 200 has changed, the determination accuracy can thus be improvable.

(1e) The state information may be the elapsed time (i.e., the post-determination elapsed time) since the applicable power value was most recently determined. The power determination unit 61 may be configured to determine that the state of the housing 200 has changed when at least the post-determination elapsed time becomes equal to or greater than the state threshold value (i.e., the threshold time value). By setting the threshold time value appropriately, the applicable power value is updatable at appropriate time intervals.

(1f) In S145, the power determination unit 61 may be configured to sequentially transmit the test signal to the target device (i.e., the terminal device X4) orderly at a plurality of predetermined selected power values when the predetermined execution condition is satisfied. The execution condition is a condition fulfillment of which leads to a determination of the applicable power value. In the above embodiment, the execution condition is that the state of the housing 200 has changed. As a result, every time the state of the housing 200 changes, the test signal is transmitted and the applicable power value is determined as described above. Such a scheme described above thus allows determination of the applicable power value according to the change of the state depending on the changing states and situations, i.e., time to time, thereby preventing/suppressing the deterioration of communication quality.

The power determination unit 61 may be configured to determine, in S160, the selected power value when the communication index (i.e., BER) included in the reception information transmitted from the target device is within the predetermined range as the applicable power value. Since the wireless communication signal is transmitted with the applicable power value at that time, the communication quality at that time can thus be maintainable.

(1g) The communication system 100 uses the management device 2 as a variable device and determines the transmission power value to the terminal device 4 as the applicable power value. Therefore, even if the change in the state of the housing 200 affects the transmission characteristics of the wireless communication signal transmitted by the management device 2, the management device 2 can determine the applicable power value in response, for maintaining the communication quality in a reliable state, and for enabling the management device 2 to transmit the battery information more reliably to the target device.

In the present embodiment, the management device 2 may be a variable device, and the terminal device 4 may be a target device. The management control unit 23 may include a power determination unit, a transmission instruction unit, a test transmission unit, and a test determination unit. S145 is performed by a test transmission unit, and S160 is performed by a test determination unit.

1-4. Modification Example

In the above-described first embodiment, an example in which the management device 2 is a variable device and the terminal device 4 is a target device has been described. However, the present disclosure is not limited to this example. A modification example is shown in the following.
<First Modification, FIG. 7>

In a first modification, the management device 2 may be the target device and the terminal device 4 may be the variable device. That is, the terminal device 4 may be configured to determine, as the applicable power value, the transmission power value of the wireless communication signal transmitted to the management device 2. When the change in the state of the housing 200 affects the transmission characteristics of the wireless communication signal by the terminal device 4, the applicable power value can be determined on the terminal device 4 side, for maintaining the communication quality in a reliable state, and for more reliable reception of the battery information by the management device 2.

Here, the management control unit 23 includes a configuration similar to the response unit 71 included in the terminal control unit 43 (hereinafter, referred to as a response unit included in the management control unit 23) instead of including the power determination unit 61 described above. That is, the response unit (not shown) included in the management control unit 23 performs the same process as the above-described response process.

On the other hand, the terminal control unit 43 includes, in place of the response unit 71 described above, a configuration substantially same as the power determination unit 61 included in the management control unit 23 described above (hereinafter, referred to as a power determination unit included in the terminal control unit 43). That is, the power determination unit (not shown) included in the terminal control unit 43 performs almost the same process as the above-described electric power determination process.

Figure 5:
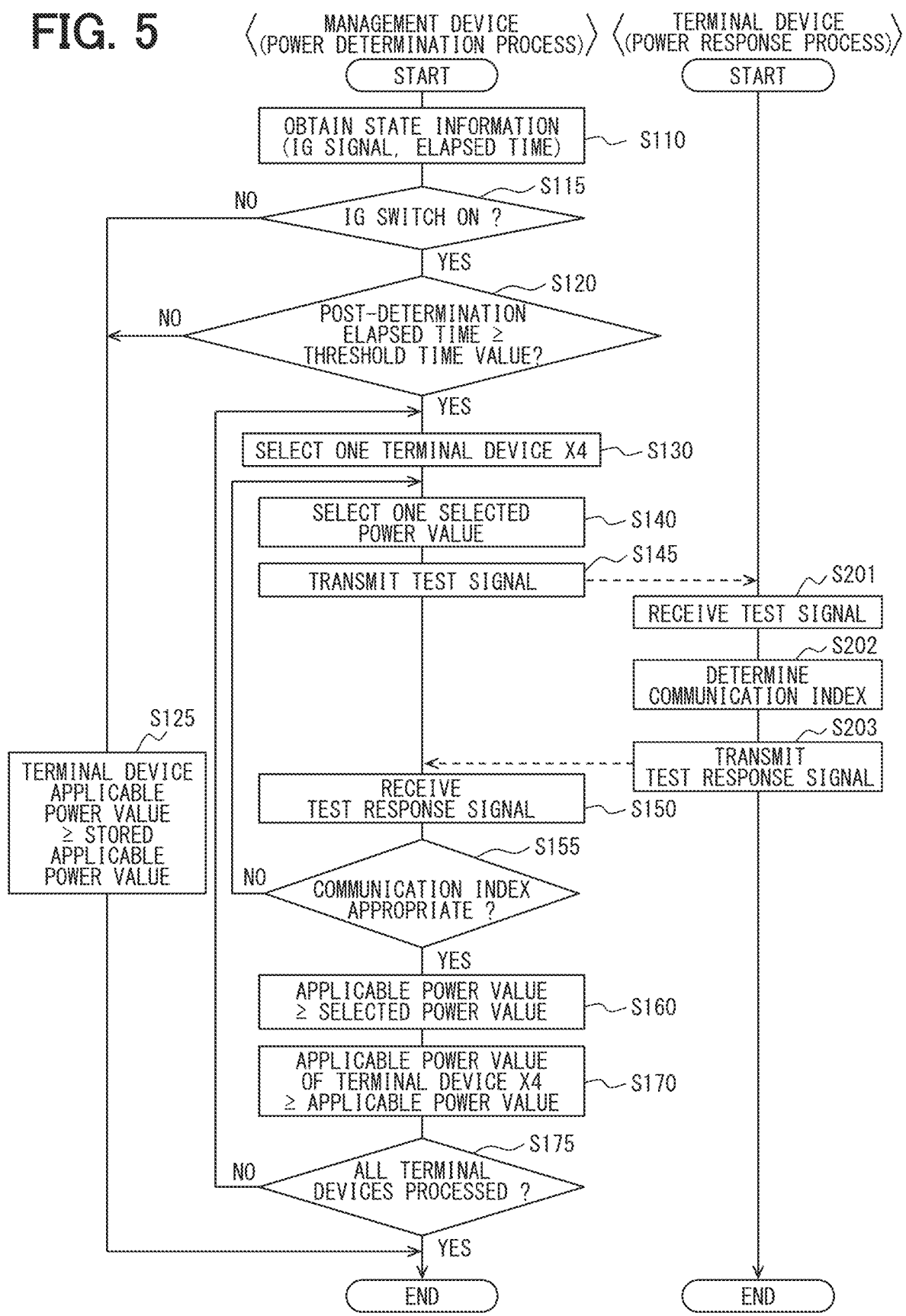
FIG. 5 is a flowchart of a power determination process performed by a management control unit and a power response process performed by a terminal control unit in a first embodiment.

Note that, however, the communication system 100 includes a plurality of terminal devices 4, and the plurality of terminal control units 43 sequentially determine the transmission power value to the management device 2 as the applicable power value, which is a difference of the power determination process performed by the terminal control unit 43 from the power determination process shown in FIG. 5.

Hereinafter, each process is described with reference to a flowchart shown in FIG. 7, focusing on differences therefrom. The terminal control unit 43 repeats the power determination process shown in FIG. 7 in a predetermined cycle. In S210-S220, the terminal control unit 43 performs the same process as in S110-S120 (of FIG. 5).

The terminal control unit 43 sets the applicable power value for the management device 2 to an applicable power value then stored in the memory 47 in S225, which comes after S215 and S220 in which the state of the housing 200 has been determined as not changed and the process is complete.

The terminal control unit 43 obtains a terminal device number n in S226, which comes after determination that the state of the housing 200 is changed in S215 and S220. The terminal device number n is a number sequentially assigned to each of the plurality of terminal devices 4 included in the communication system 100. For example, the terminal device 41 (in FIG. 2) has a terminal device number of 1 (i.e., n=1) assigned thereto, the terminal device 4_2 has a terminal device number of 2 (i.e., n=2) assigned thereto, and so on. A terminal device number n is assigned in advance for each terminal device 4. Note that the terminal device number n may be sequentially assigned to any terminal device 4. The terminal device number n assigned in advance is stored in the memory 47 in advance.

Subsequently in S227, the terminal control unit 43 determines whether or not the terminal device number n of a subject device including the terminal control unit 43 itself is 1. The terminal control unit 43 shifts the process to S240 when the terminal device number n is 1, and shifts the process to S228 when the terminal device number n is not 1.

The terminal control unit 43 waits until the terminal control unit 43 receives an update instruction indicating an update number y that indicates the terminal device number n of the subject device in S228, which comes after determination that the terminal device number n is not 1. Upon receiving the update instruction, the terminal control unit 43 shifts the process to S240. The update instruction is an instruction for starting the process of determining the transmission power value to the target device (i.e., the management device 2 in the present modification) as the applicable power value (i.e., the process of S240 and subsequent steps).

Note that in the present modification, the update instruction is an instruction transmitted from the terminal device 4 having the terminal device number assigned as an update number y−1. The update number y indicates a terminal device number of the terminal device 4 from which the process of determining the transmission power value to the management device 2 as the applicable power value starts.

Similarly to S140, in S240 which comes after (i) determination that the terminal device number n is 1 or (ii) reception of an update instruction having the terminal device number n assigned as an update number y indicating the subject device, the terminal control unit 43 selects one of a plurality of selected power values (i.e., from among predetermined values). The plurality of selected power values may be the same as or different from the plurality of selected power values in S140. The plurality of selected power values are stored in the memory 47 in advance.

Subsequently in S245, the terminal control unit 43 uses the wireless communicator 42 to transmit a test signal to the management device 2 with the selected power value selected in S240. Here, the management device 2 (i.e., the management control unit 23) starts the power response process triggered by the transmission of the test signal from the terminal device 4 as the variable device.

The management control unit 23 receives the test signal in S101. Subsequently in S102, the management control unit 23 determines the BER based on the received test signal. In the management device 2, the test pattern described above are stored in the memory 27 in advance. The management control unit 23 confirms a match between the test pattern included in the received test signal and the test pattern stored in the memory 27 (i.e., the correct test pattern), and determines the BER.

In S103, the management control unit 23 uses the wireless communicator 22 to generate reception information including at least the BER determined in S102, and transmits a wireless communication signal including the reception information (hereinafter, a test response signal) to the terminal device 4. Thus, the management device 2 ends the power response process.

On the other hand, in S250, the terminal control unit 43 receives the test response signal including the reception information from the management device 2 as the target device. The terminal control unit 43 stores the reception information in the memory 47. Subsequently in S255, the terminal control unit 43 obtains the communication index (i.e., BER) included in the reception information transmitted from the management device 2 that is the target device, and determines, as the applicable power value, the transmission power value when the communication index is within a predetermined range. For example, the memory 47 stores a threshold index value in advance. When the BER is less than the threshold index value, the terminal control unit 43 determines that the communication index is appropriate.

Here, the terminal control unit 43 shifts the process to S240 when it is determined that the communication index is not appropriate, and repeats the process of S240-S255. That is, the test signal is repeatedly transmitted to the management device 2 with the transmission power value changed until it is determined that the communication index is appropriate. On the other hand, when the communication index is determined as appropriate, the terminal control unit 43 shifts the process to S260.

In S260, the terminal control unit 43 determines, as the applicable power value, the selected power value selected in S240 when the communication index is determined as appropriate. In S270, the terminal control unit 43 sets the applicable power value determined in S260 as the applicable power value to the management device 2. That is, the terminal control unit 43 stores the management device 2 and the determined applicable power value in the memory 47 in association with each other.

In S285, the terminal control unit 43 transmits an update instruction indicating that the update number y is n+1 to the terminal device 4 having the update number y (i.e., y=n+1). As a result, in the terminal device 4 having the terminal device number y, which is on standby, the process of determining the applicable power value to the management device 2 (i.e., the process of S240 and thereafter) is started. The terminal control unit 43 thus ends the power determination process. When the communication system 100 includes m pieces of the terminal devices 4, S285 may be deleted/skipped in the above-described power determination process in the terminal device 4 whose terminal device number is m (m: integer of 2 or more).

In the modification example 1, when it is determined that the state of the housing 200 has changed, the process of determining the transmission power value to the management device 2 as the applicable power value is performed in the plurality of terminal devices 4, i.e., starting from the terminal device 4 having the terminal device number 1, and then sequentially in the device 4 with the device number 2 and so on. In such manner, the same effects as that of the above-described embodiment are achievable. This scheme is particularly effective when change in the state of the housing 200 influences the transmission characteristics of the wireless communication signal by the terminal device 4.

In the present modification, the management device 2 may be a target device and the terminal device 4 may be a variable device. The terminal control unit 43 may be a power determination unit, a transmission instruction unit, a test transmission unit, and a test determination unit. S245 may be the process as a test transmission unit, and S260 may be the process as a test determination unit.

<Second Modification, FIGS. 8-11>

In a second modification, the management device 2 may be a variable device and the terminal device 4 may be a target device, AND the management device 2 may also be a target device and the terminal device 4 may also be a variable device. That is, the management device 2 may be configured to determine the transmission power value of the wireless communication signal transmitted to the terminal device 4 as the applicable power value, and the terminal device 4 may be configured to determine the transmission power value of the wireless communication signal transmitted to the management device 2 as the applicable power value.

If the change in the state of the housing 200 affects the transmission characteristics of the wireless communication signal transmitted from both of the management apparatus 2 and the terminal device 4, the management apparatus 2 and the terminal device 4 can respectively determine the applicable power value. In such manner, the communication quality can be maintained in a reliable state and the management device 2 can receive the battery information more reliably.

For example, in the second modification, the management device 2 may be configured to determine the applicable power value, and subsequently, the plurality of terminal devices 4 may be configured to sequentially determine the applicable power value. Here, the management control unit 23 includes (i) the above-described power determination unit 61 and (ii) the response unit included in the management control unit 23 described in the first modification. However, the power determination process shown in FIG. 8 performed by the management device 2 of the modification example 2 is different from the process shown in FIG. in that the plurality of terminal devices 4 subsequently determine the applicable power value in order (i.e., one by one). Note that the power determination unit 61 and the response unit included in the management control unit 23 described above can perform processes in parallel.

On the other hand, the terminal control unit 43 includes (i) the response unit 71 described above and (ii) the power determination unit included in the terminal control unit 43 described in the first modification. However, the power determination process shown in FIG. 9 performed by the terminal control unit 43 of the second modification is different from the process shown in FIG. 7 in that the applicable power value is determined subsequent to the determination by the management device 2. Note that the response unit 71 and the power determination unit included in the terminal control unit 43 described above can perform processes in parallel.

Hereinafter, each process is described with reference to flowcharts shown in FIGS. 8 and 9 focusing on the difference. The power determination process shown in FIG. 8 performed by the management control unit 23 of the second modification is different from the power determination process shown in FIG. 5 in that S180 is added.

In S110-S175, the management control unit 23 performs the same process as the process shown in FIG. 5. That is, the management control unit 23 determines the applicable power value for all of the terminal devices 4, and then the process proceeds to S180.

In S180, the management control unit 23 transmits an update instruction indicating that the update number y is 1 to the terminal device 4 whose terminal device number n is 1. In such manner, as is described later, in the terminal device 4 whose terminal device number is 1, which is on standby, the process of determining the applicable power value to the management device 2 is started. That is, after the applicable power value is determined by the management device 2, the terminal device 4 subsequently starts determination of the applicable power value.

Figure 7:
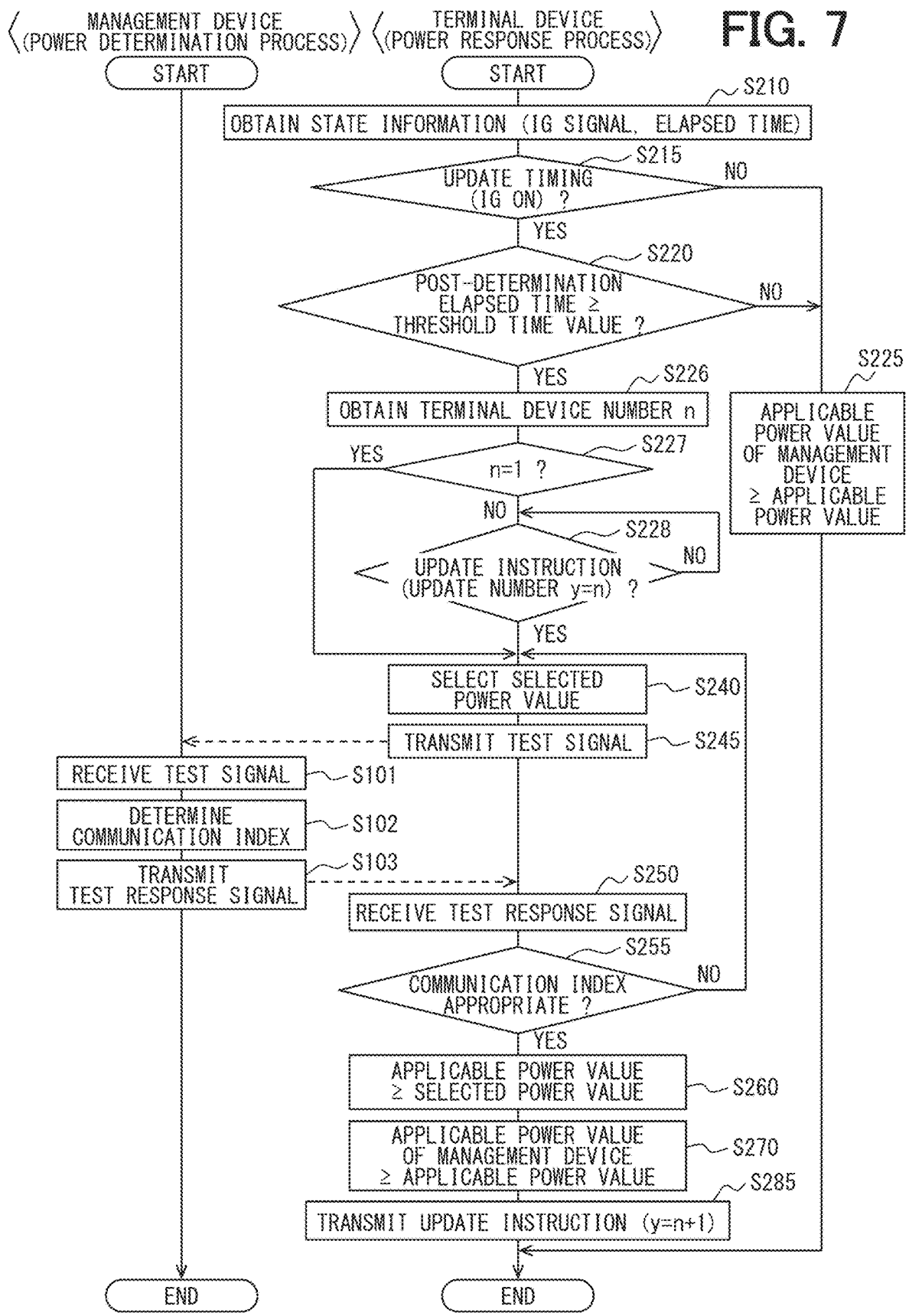
FIG. 7 is a flowchart of the power response process performed by the management control unit and the power determination process performed by the terminal control unit in a first modification.
Figure 9:
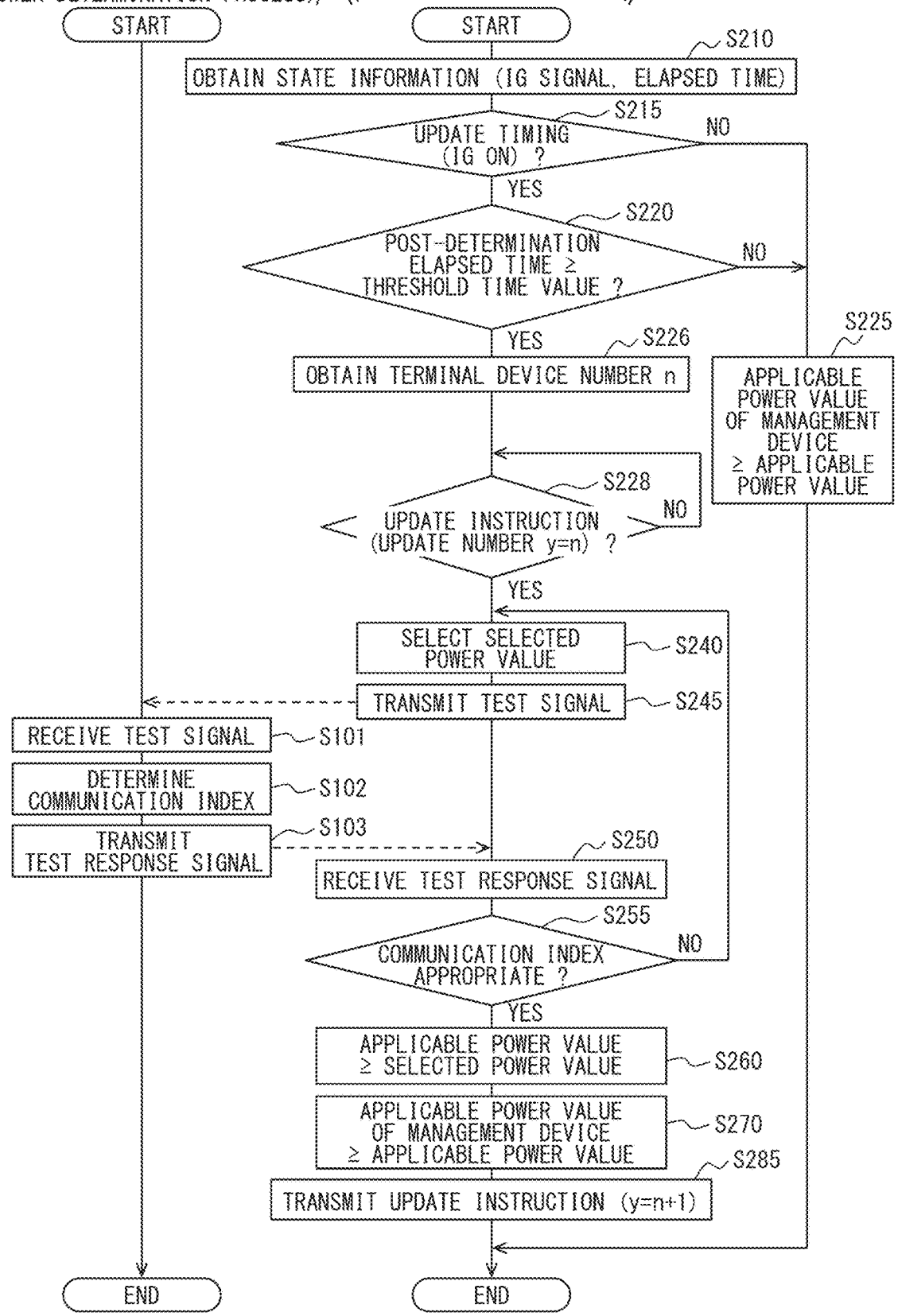
FIG. 9 is a flowchart of the power response process performed by the management control unit and the power determination process performed by the terminal control unit in the second modification.

The power determination process shown in FIG. 9 performed by the terminal control unit 43 of the second modification is different from the power determination process shown in FIG. 7 in that S227 is deleted. That is, the terminal control unit 43 obtains the terminal device number in S226, and then shifts the process to S228.

In S228, the terminal control unit 43 waits until receiving an update instruction indicating that the update number y indicates/designates the terminal device number n of the subject device (i.e., the update number y=1), and when such update instruction is received, the terminal control unit 43 proceeds the process to S240. After S240, the terminal control unit 43 performs the same process as the process shown in FIG. 7.

In such manner, in the present modification, the same effects as that of the above-described embodiment are achievable. This scheme is effective in particular when change of the state of the housing 200 influences the transmission characteristics of the wireless communication signal by both of the management device 2 and the terminal device 4.

In the present modification, the management device 2 may be a variable device and the terminal device 4 may be a target device. In this case, the management control unit 23 may be a power determination unit, a transmission instruction unit, a test transmission unit, and a test determination unit. S145 may be the process as a test transmission unit, and S160 may be the process as a test determination unit. Further, the management device 2 may be a target device, and the terminal device 4 may be a variable device. In this case, the terminal control unit 43 may be a power determination unit, to a transmission instruction unit, to a test transmission unit, and to a test determination unit. S245 may be the process as a test transmission unit, and S260 may be the process as a test determination unit.

<Third Modification>

In the second modification described above, the management device 2 is configured to determine the applicable power value, and subsequently, the plurality of terminal devices 4 are configured to sequentially determine the applicable power value. However, the present disclosure is not limited to such configuration. In a third modification, the plurality of terminal devices 4 may be configured to sequentially determine the applicable power value, and then the management device 2 may be configured to determine the applicable power value. Thereby, the same effects as the second modification are achievable.

Figure 8:
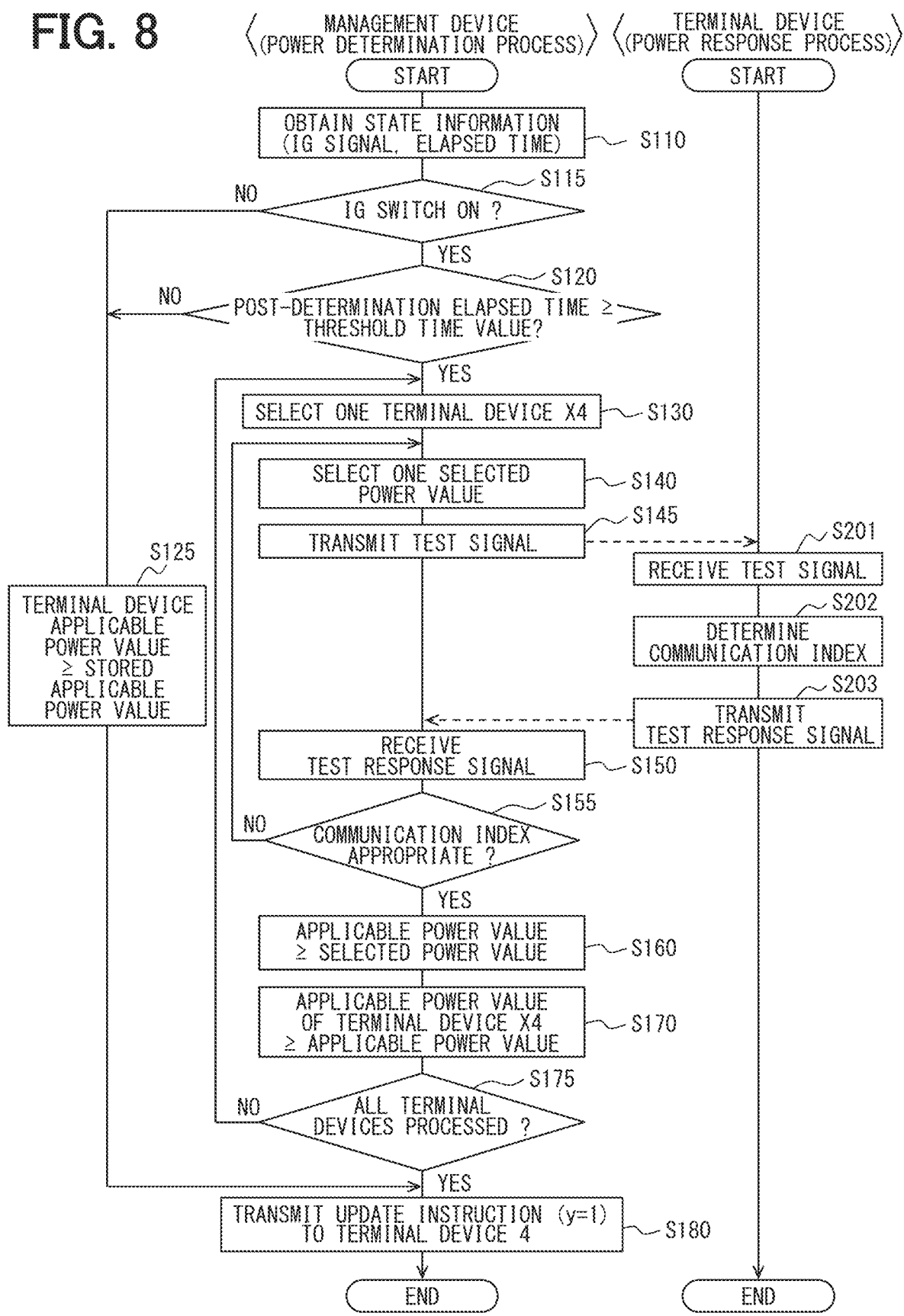
FIG. 8 is a flowchart of the power determination process performed by the management control unit and the power response process performed by the terminal control unit in a second modification.

In this case, the terminal device 4 may be configured to perform the power determination process shown in FIG. 8. Then, for example, when the communication system 100 includes m pieces of the terminal device 4, the m-th terminal device 4 may be configured to transmit the update instruction to the management device 2 instead of performing the process of S285 as a process subsequent to S270. For example, in the power determination process shown in FIG. 5, the management device 2 waits until receiving the update instruction after the positive determination in S120, and the process proceeds to S130 when the update instruction is received. Then, the process of determining the applicable power value may be started.

Figure 10:
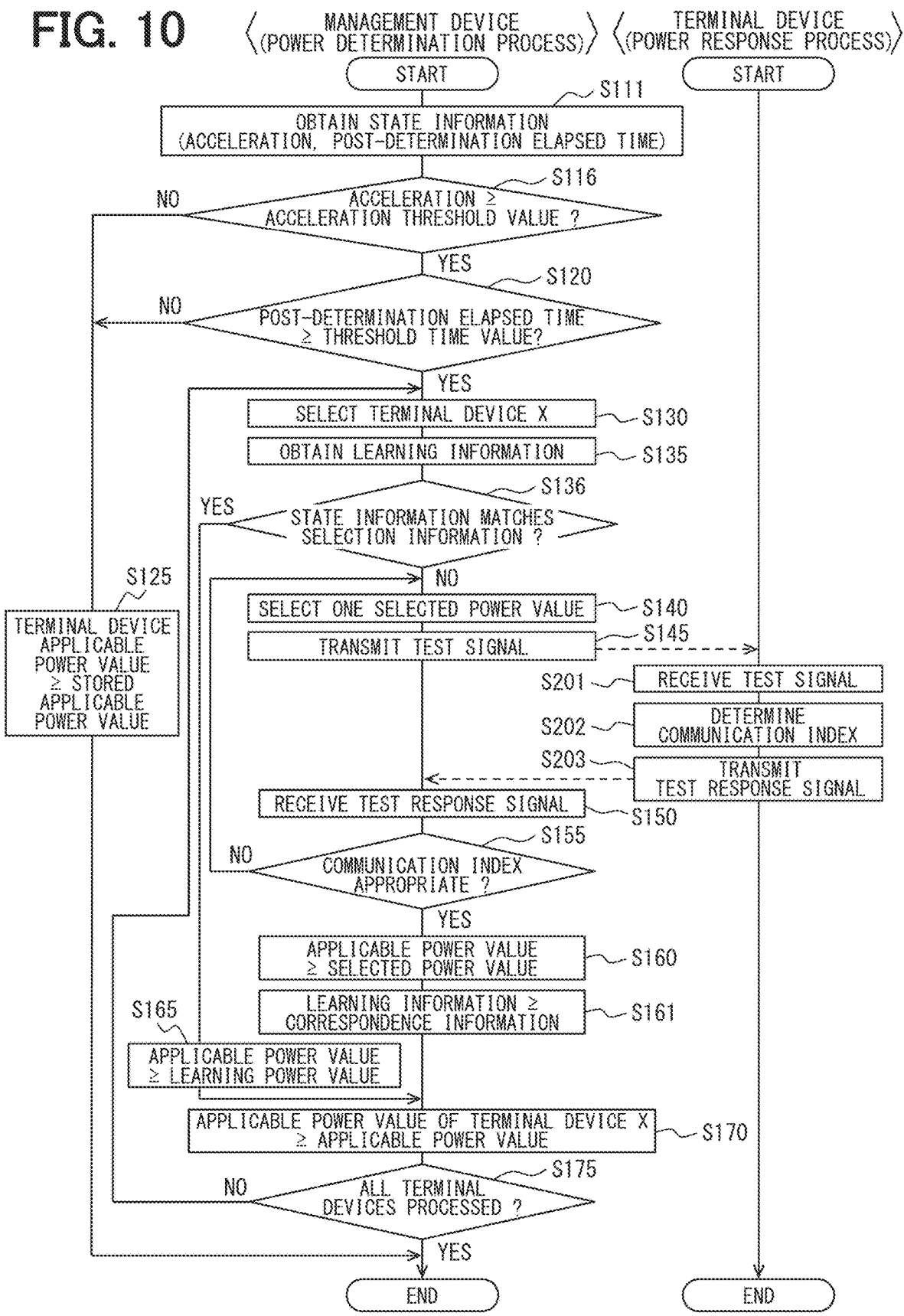
FIG. 10 is a flowchart of the power determination process performed by the management control unit and the power response process performed by a terminal control unit in a second embodiment.
Figure 11:
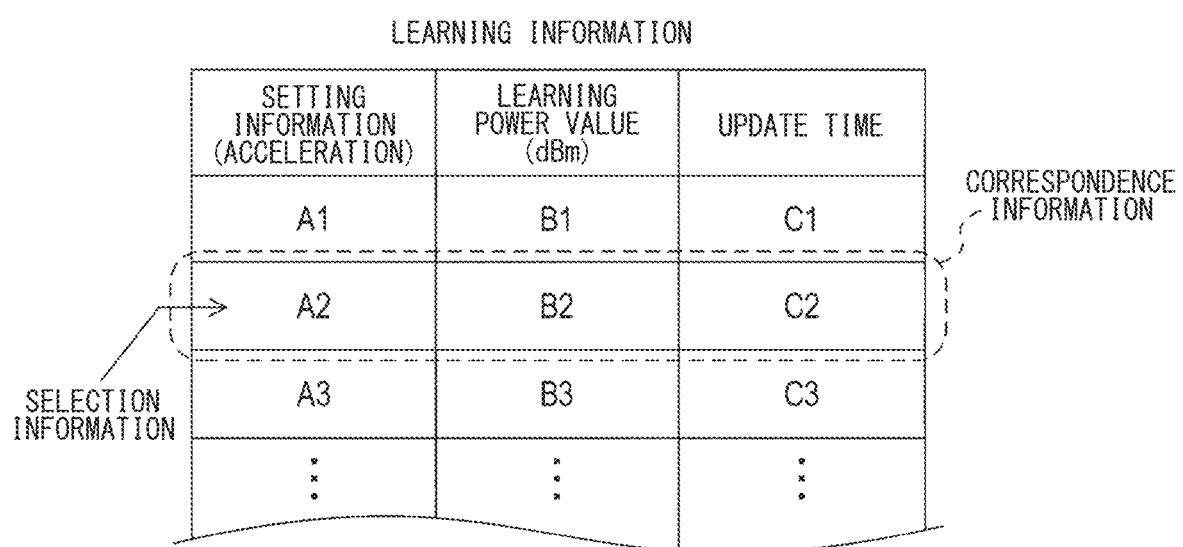
FIG. 11 is a diagram of an example of correspondence information according to the second embodiment.

Second Embodiment, FIGS. 10-11

2-1. Differences from First Embodiment

The fundamental configuration of the second embodiment is similar to that of the first embodiment. Therefore, a difference therebetween is described in the following. The same reference numerals as in the first embodiment denote the same components, and reference is made to the preceding description.

In the second embodiment, similar to the first embodiment, the management device 2 is a variable device and the terminal device 4 is a target device. In the above-described first embodiment, it is determined that the state of the housing 200 has changed when it is in the specific state (i.e., the ignition switch is turned ON) and the post-determination elapsed time is equal to or greater than the threshold time value, then the test signal is transmitted and the applicable power value is determined.

On the other hand, in the second embodiment, when (i the state information quantitatively indicating the vibration of the housing 200 is equal to or greater than the state threshold value and (ii) the post-determination elapsed time is equal to or greater than the threshold time value, it is determined that the state of the housing 200 is changed, which is different from the first embodiment in that how it is determined whether the change of the state has occurred. Further, the second embodiment is different from the first embodiment in that the applicable power value is determined using learning information including (i) setting information described later and (ii) learning power value associated with the setting information.

In the present embodiment, an acceleration of the vehicle V1 is used as the state information that quantitatively indicates/represents the vibration of the housing 200.

2-2. Process

Next, the power determination process performed by the management control unit 23 of the second embodiment in place of the power determination process of the first embodiment (i.e., FIG. 5) is described with reference to a flowchart in FIG. 10. Since the process of S140-S160 in FIG. 10 is the same as the process of S140-S160 in FIG. 5, a part of the description is simplified.

The management control unit 23 first obtains the state information in S111 (in FIG. 10). As the state information, information indicating the magnitude of vibration of the housing 200 and the post-determination elapsed time are obtained as the state information. In the present embodiment, more specifically, information indicating the acceleration of the vehicle V1 is obtained as information indicating the magnitude of vibration of the housing 200.

Subsequently in S116 to S120, the management control unit 23 determines whether or not the state of the housing 200 has changed, based on the state information. In the present embodiment, when (i) the vibration of the housing 200 is relatively large and (ii) the post-determination elapsed time is long, it is determined that the state of the housing 200 has changed.

First, in S116, the management control unit 23 determines whether or not the vibration of the housing 200 is relatively large. More specifically, the management control unit 23 determines that the vibration of the housing 200 is relatively large when the acceleration of the vehicle V1 is equal to or greater than a predetermined acceleration threshold value. The management control unit 23 shifts the process to S125 when the acceleration of the vehicle V1 is less than the acceleration threshold value, and shifts the process to S120 when the acceleration is equal to or greater than the acceleration threshold value.

Subsequently in S120, the management control unit 23 obtains the post-determination elapsed time and determines whether the post-determination elapsed time is equal to or greater than the threshold time value. The management control unit 23 shifts the process to S125 when the post-determination elapsed time is less than the threshold time value, and shifts the process to S130 when the post-determination elapsed time is equal to or greater than the threshold time value.

The management control unit 23 performs the same process as S125 of FIG. 5 in S125 of FIG. 10, which comes after occasion of when it is determined that the state of the housing 200 has not changed. That is, the management control unit 23 sets the applicable power value for each of the plurality of terminal devices 4 to the applicable power value stored in the memory 27 at such time, and the present process ends.

The management control unit 23 selects one of the plurality of terminal devices 4 included in the communication system 100 in S130 which comes after determination that change has occurred in the state of the housing 200. In the following, the selected terminal device 4 is described as a terminal device X4.

Subsequently in S135, the management control unit 23 obtains the learning information of the terminal device X4. The learning information is information including at least one set of correspondence information. The correspondence information includes at least the setting information and the learning power value associated with the setting information. The setting information is state information indicating a predetermined numerical value included in the learning information. The learning power value is a predetermined power value associated with the setting information in the learning information. In the present embodiment, the learning information includes a plurality of sets of correspondence information.

In the present embodiment, the correspondence information includes, in addition to the setting information and the learning power value, information indicating a time when the learning power value associated with the setting information is determined. The learning information is set for each terminal device 4 and stored in the memory 27. FIG. 11 shows an example of the learning information of the present embodiment in which the state information is the acceleration of the vehicle V1.

Subsequently in S136, when it is determined that the state of the housing 200 has changed, the management control unit 23 determines whether the state information obtained in S111 matches selection information included in the learning information. The selection information is one of plural pieces of setting information included in the learning information. In other words, the management control unit 23 determines that the obtained state information and the selection information match with each other when the obtained state information is included in a predetermined range including the selection information. The management control unit 23 shifts the process to S165 when it determines that they match, and shifts the process to S140 when it determines that they do not match.

In S140 and subsequent steps up to S160 which comes after determination that the state information obtained in S116 does not fall within the predetermined range including the selection information included in the learning information, the management control unit 23 determines the applicable power value by transmitting the test signal to the terminal device X4 serving as the target device by sequentially changing the power value, i.e., starting with one of the predetermined selected power values.

Subsequently in S161, the management control unit 23 generates one set of new correspondence information based on the result of S160. That is, the management control unit 23 generates one set of new correspondence information including (i) the acceleration of the vehicle V1 as new setting information, which is the state information obtained in S111, and (ii) the applicable power value determined in S160 as a new learning power value. Then, the management control unit 23 adds the new correspondence information to the learning information stored in the memory 27. Then, the learning information to which the new correspondence information is added is stored in the memory 27 as new learning information. In such manner, the number of correspondence information included in the learning information increases.

In S165 which comes after determination of match between (i) the acceleration of the vehicle V1 that is the state information obtained in S111 and (ii) the selection information that is one of the setting information included in the learning information, the learning power value corresponding to the selection information is determined as the applicable power value.

In S170, the management control unit 23 sets the applicable power value determined in S160 or S165 as the applicable power value of the terminal device X4, and associatively stores the terminal device X4 with the determined applicable power value in the memory 27.

In S175, the management control unit 23 shifts the process to S130 when the applicable power values have not been determined for all of the terminal devices 4, and repeats the process of S130-S175. On the other hand, the management control unit 23 ends the present power determination process when the applicable power values are determined for all of the terminal devices 4.

2-3. Effects

According to the second embodiment described in details above, the effects (1a), (1d), (1g) of the above-described first embodiment are achievable, and the following effects are also achievable.

(2a) In S111 of FIG. 10, the power determination unit 61 obtains the acceleration of the vehicle V1 as the state information. In S135, the power determination unit 61 obtains the learning information including at least one set of correspondence information. In S136, when it is determined that the state of the housing 200 has changed, the power determination unit 61 determines that the above-described acceleration, which is the obtained state information, is within a predetermined range including the selection information which is one of the setting information included in the learning information.

Here, in S165, the power determination unit 61 determines the learning power value associated with the selection information as the applicable power value when the obtained state information is included in the predetermined range including the selection information. In such manner, the applicable power value is determinable based on the learning information without transmitting the test signal, thereby reducing a process load for determining the applicable power value.

On the other hand, when it is determined in S140 to S160 that the state of the housing 200 has changed, the power determination unit 61 determines the applicable power value when the execution condition is satisfied, which is a condition that the obtained state information is not included in the predetermined range including the selection information. In such manner, the applicable power value is determinable even when the learning power value corresponding to the obtained state information is not stored in the learning information.

(2b) In S161 as a storage execution unit, the power determination unit 61 adds the information that associates the obtained state information and the applicable power value determined in S140 to S160 to the learning information, when the obtained state information is not included in the predetermined range including the selection information. Then, the power determination unit 61 may be configured to store the learning information to which the above-described information is added in the memory 27 as new learning information. In such manner, the learning information is updatable.

(2c) The state information for determining whether the state of the housing 200 has changed may be information that quantitatively indicates the vibration state of the housing 200. The electromagnetic field intensity distribution in the housing 200 may change due to the vibration of the housing 200. By using the information that quantitatively indicates the vibration of the housing 200 as the state information, it is possible to accurately determine, as quantity in number or numerically, the state in which the electromagnetic field intensity distribution in the housing 200 may possibly change.

(2d) Specifically, the housing 200 may be mounted on the vehicle, and the state information may be the acceleration of the vehicle V1. The power determination unit 61 may determine that the state of the housing 200 has changed when the acceleration of the vehicle V1 becomes equal to or greater than the acceleration threshold value serving as the state threshold value. When the acceleration of the vehicle V1 is relatively large, it is considered that the arrangement of various devices in the housing 200 may change and the electromagnetic field intensity distribution in the housing 200 may possibly change. In the present embodiment, since the applicable power value is determined when the acceleration of the vehicle V1 is relatively large, it is possible to prevent/suppress the deterioration of communication quality.

In the present embodiment, the management device 2 may be a variable device, and the terminal device 4 may be a target device. The management control unit 23 may be a power determination unit, a transmission instruction unit, a test transmission unit, a test determination unit, a state obtaining unit, a correspondence information obtaining unit, a correspondence determination unit, and a selection determination unit. S145 may be the process as a test transmission unit, and S160 may be the process as a test determination unit. S111 may be the process as a state obtaining unit, S135 may be the process as a correspondence information obtaining unit, S136 may be the process as a correspondence determination unit, and S165 may be the process as a selection determination unit.

2-4. Modification

Modifications of the second embodiment are described in the following.

Figure 12:
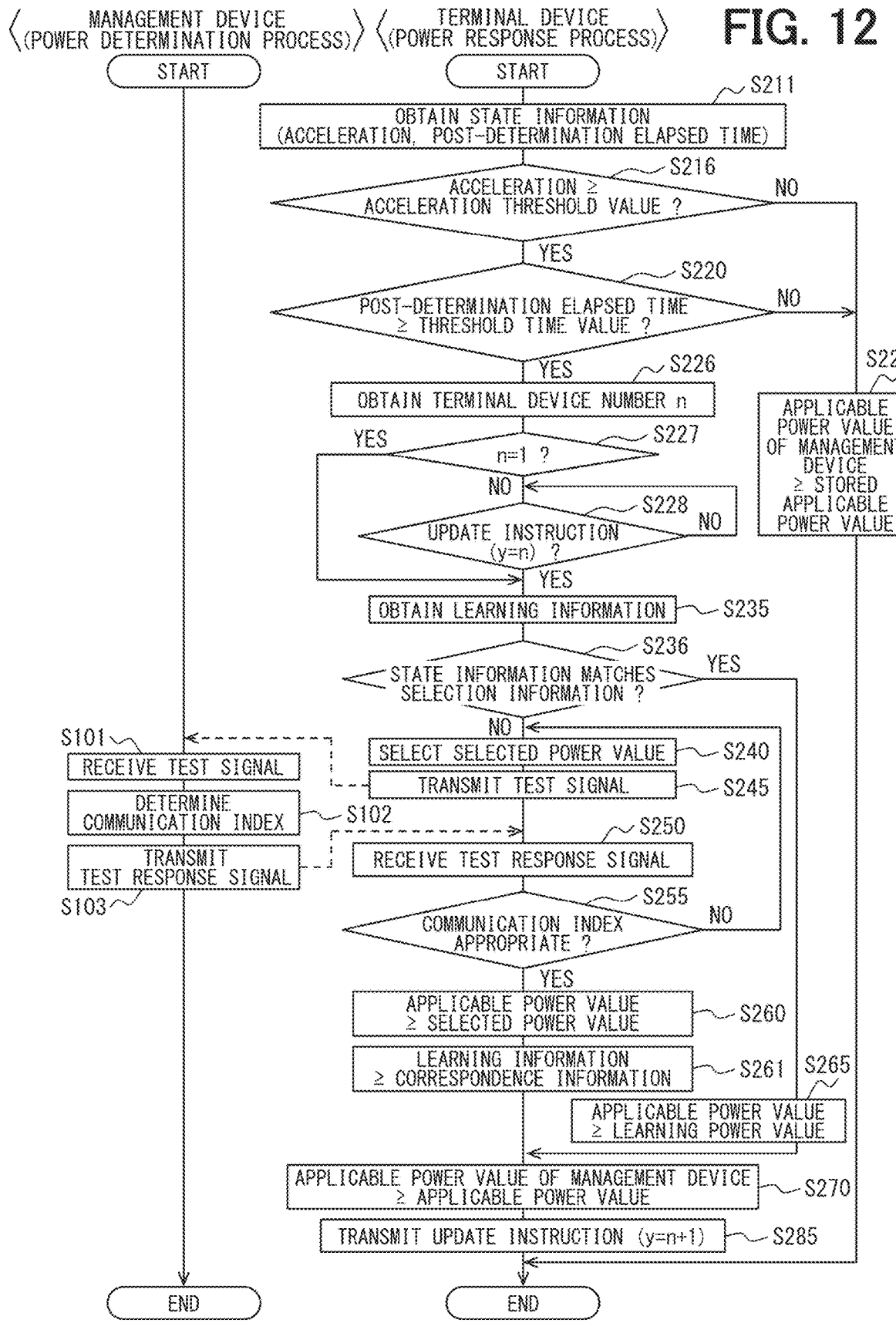
FIG. 12 is a flowchart of the power response process performed by the management control unit and the power determination process performed by the terminal control unit in a fourth modification.

(Fourth Modification, FIG. 12, Based on Second Embodiment)

In a fourth modification, just like the first modification described above, the management device 2 of the second embodiment may be a target device and the terminal device 4 of the second embodiment may be a variable device. That is, the plurality of terminal devices 4 may be configured to sequentially determine the transmission power value of the wireless communication signal to be transmitted to the management device 2 as the applicable power value based on the learning information. Also in the present modification, the same effects as that of the second embodiment are achievable. This scheme is particularly effective when change in the state of the housing 200 influences the transmission characteristics of the wireless communication signal by the terminal device 4.

The power response process performed by the management device 2 (i.e., the management control unit 23) of the present modification and the power determination process performed by each of the terminal devices 4 (i.e., the terminal control unit 43) of the present modification are described using a flowchart in FIG. 12. In the following, differences from the flowchart of FIG. 10 (i.e., the power determination process by the management device 2 of the second embodiment) and the flowchart of FIG. 7 (i.e., the power determination process by the terminal device 4 of the first embodiment) are mainly described.

In S211-S220 of FIG. 12, the terminal control unit 43 performs the same process as in S111-S120 of FIG. 10. That is, when it is determined that the acceleration of the vehicle V1 is equal to or greater than the acceleration threshold value in S211, and when it is determined that the post-determination elapsed time is equal to or greater than the threshold time value in S220, the terminal control unit 43 determines that change in the state of the housing 200 has occurred.

The terminal control unit 43 sets the applicable power value of the management device 2 to the applicable power value stored in the memory 47 at the moment in S225, which comes after determination that no change in the state of the housing 200 has occurred, and then ends the present process.

In S226-S228 of FIG. 12, the terminal control unit 43 performs the same process as S226-S228 of FIG. 7, which comes after determination that change in the state of the housing 200 has occurred. Subsequently in S235, the terminal control unit 43 obtains the learning information set for the management device 2. The learning information is stored in the memory 47.

Subsequently in S236, the terminal control unit 43 determines whether the state information (i.e., the acceleration of the vehicle V1) obtained in S111 when it is determined that the state of the housing 200 has changed matches the selection information, which is one of the setting information included in the learning information. The terminal control unit 43 shifts the process to S265 when it determines that they match, and shifts the process to S240 when it determines that they do not match.

In S240-S260, the terminal control unit 43 performs the same process as in S240-S260 of FIG. 7, and determines the applicable power value of the management device 2. Subsequently in S261, the terminal control unit 43 adds, to the learning information already stored in the memory 47, the acceleration of the vehicle V1 which is the state information obtained in S211 and the applicable power value determined in S260 as one set of new correspondence information. Then, the learning information to which the new correspondence information is added is stored in the memory 47 as new learning information.

In S265, which comes after determination that the state information (i.e., the acceleration of the vehicle V1) obtained in S211 matches the selection information which is one of the setting information included in the learning information, the terminal control unit 43 determines the learning power value corresponding to the selection information as the applicable power value.

In S270, the terminal control unit 43 sets the applicable power value determined in S260 or S265 as the applicable power value for the management device 2, and associatively stores the management device 2 with the determined applicable power value in the memory 47.

In S285, the terminal control unit 43 transmits an update instruction indicating that the update number y is n+1 to the terminal device 4 whose terminal device number n is y, as in S285 of FIG. 7. Then, the terminal control unit 43 of the present modification ends the power determination process as described above.

In the present modification, the management device 2 is a target device and the terminal device 4 is a variable device. The terminal control unit 43 includes a power determination unit, a transmission instruction unit, a test transmission unit, a test determination unit, a state obtaining unit, an information obtaining unit, a determination unit, and a determination unit. S245 corresponds to the process as a test transmission unit, and S260 is a test determination unit. S211 is a state obtaining unit, S235 is a correspondence information obtaining unit, S236 is a correspondence determination unit, and S265 is a selection determination unit.

Figure 13:
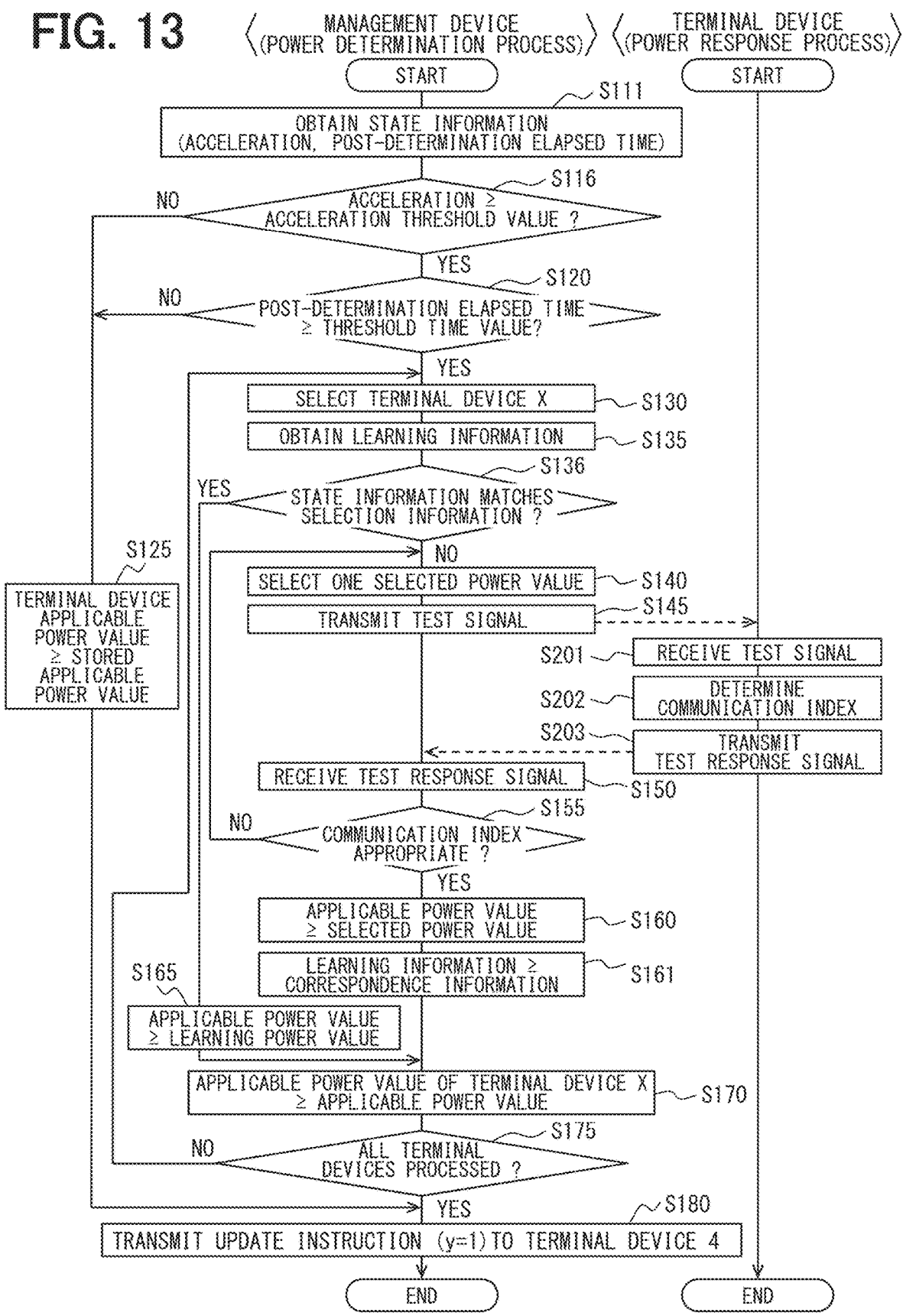
FIG. 13 is a flowchart of the power determination process performed by the management control unit and the power response process performed by the terminal control unit in a fifth modification.
Figure 14:
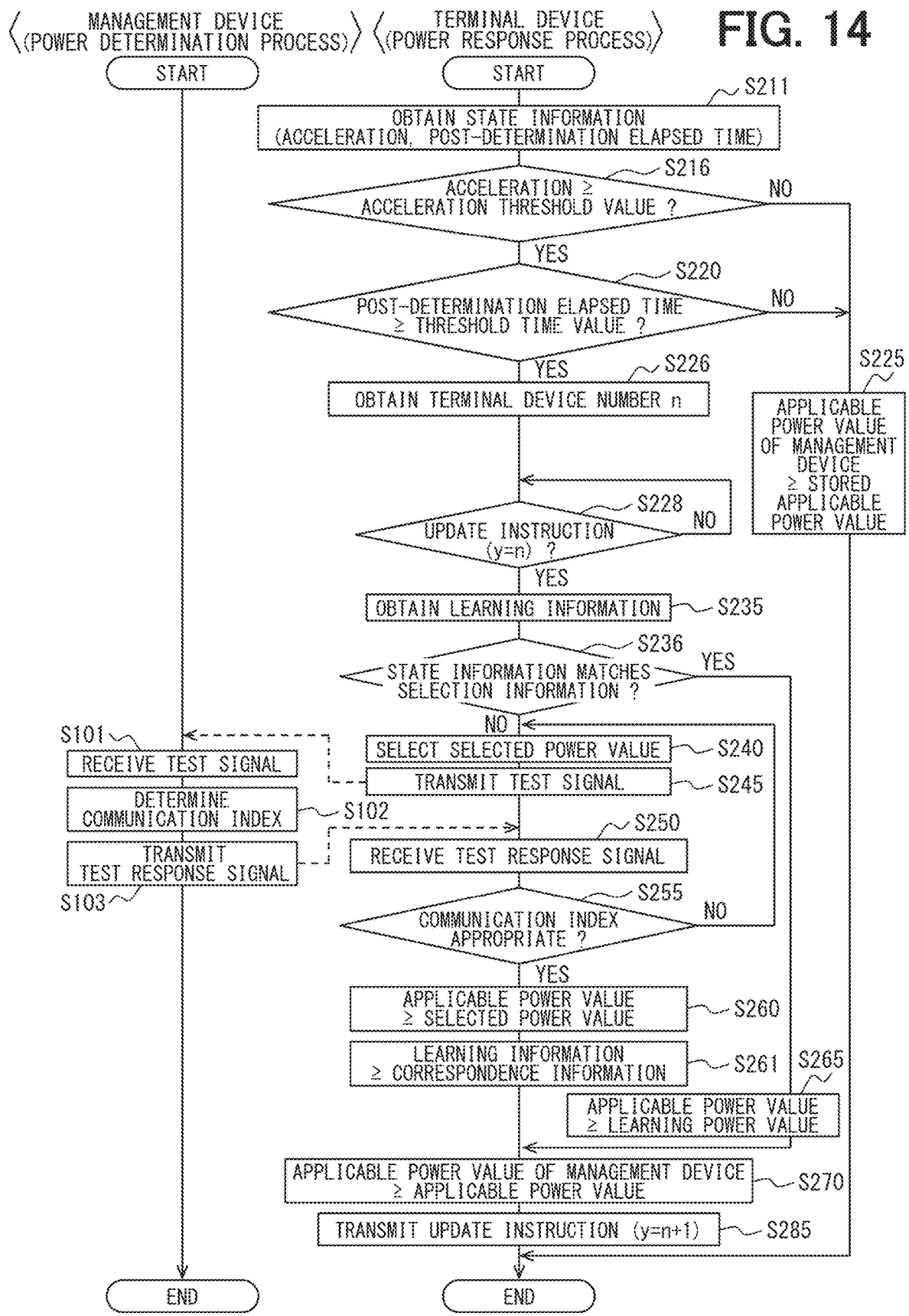
FIG. 14 is a flowchart of the power response process performed by the management control unit and the power determination process performed by the terminal control unit in the fifth modification.

<Fifth Modification, FIGS. 13-14>

In a fifth modification, just like the second modification described above, the management device 2 may be a variable device and the terminal device 4 may be a target device, AND the management device 2 may also be a target device and the terminal device 4 may also be a variable device. That is, based on the learning information, the management device 2 may be configured to determine the transmission power value of the wireless communication signal transmitted to the terminal device 4 as the applicable power value, and to determine the transmission power value of the wireless communication signal transmitted by the terminal device 4 to the management device 2 as the applicable power value.

Also in the present modification, the same effects as that of the second embodiment are achievable. This scheme is effective in particular when change of the state of the housing 200 influences the transmission characteristics of the wireless communication signal by both of the management device 2 and the terminal device 4.

For example, in the fifth modification, the management device 2 may be configured to determine the applicable power value, and subsequently, the plurality of terminal devices 4 may be configured to sequentially determine the applicable power value. The power determination process performed by the management device 2 (i.e., the management control unit 23) of the present modification and the power response process performed by each of the terminal devices 4 (i.e., the terminal control unit 43) of the present modification are described in FIG. 13 using a flowchart. The power response process performed by the management control unit 23 of the present modification and the power determination process performed by each of the terminal control units 43 of the present modification is described with reference to a flowchart of FIG. 14.

In the following, with reference to the flowchart of FIG. 10 (i.e., the power determination process by the management device 2 of the second embodiment) and the flowchart of FIG. 12 (i.e., the power determination process by the terminal device 4 of the fourth modification of the second embodiment) the differences therefrom are mainly described.

Here, the power determination process shown in FIG. 13 performed by the management control unit 23 of the present modification is different from the power determination process shown in FIG. 10 in that S180 is added. S180 shown in FIG. 13 is the same process as S180 shown in FIG. 8.

On the other hand, the power determination process shown in FIG. 14 performed by the terminal control unit 43 of the present modification differs from the power determination process shown in the flowchart of FIG. 12 in that S227 is deleted. In such manner, the management device 2 determines the transmission power value of the wireless communication signal to be transmitted to the terminal device 4 as the applicable power value based on the learning information, and the terminal device 4 determines the transmission power value of the wireless communication signal to be transmitted to the management device 2 as the applicable power value based on the learning information.

<Sixth Modification, No Figure>

In the fifth modification described above, the management device 2 is configured to determine the applicable power value based on the learning information, and then the plurality of terminal devices 4 are configured to sequentially determine the applicable power value based on the learning information. However, the present disclosure is not limited to such configuration. In a sixth modification, the plurality of terminal devices 4 may be configured to sequentially determine the applicable power value based on the learning information, and then the management device 2 may be configured to determine the applicable power value based on the learning information.

In this case, the terminal control unit 43 included in the terminal device 4 may be configured to perform the power determination process shown in FIG. 12. Then, for example, when the communication system 100 includes m pieces of the terminal device 4, the m-th terminal device 4 may be configured to transmit the update instruction to the management device 2 instead of performing the process of S285 as a process subsequent to S270. For example, in the power determination process shown in FIG. 10, the management device 2 may wait until the update instruction is received after a positive determination is made in S120, and may shift the process to S130 when the update instruction is received, and may start the process of determining the applicable power value.

Figure 15:
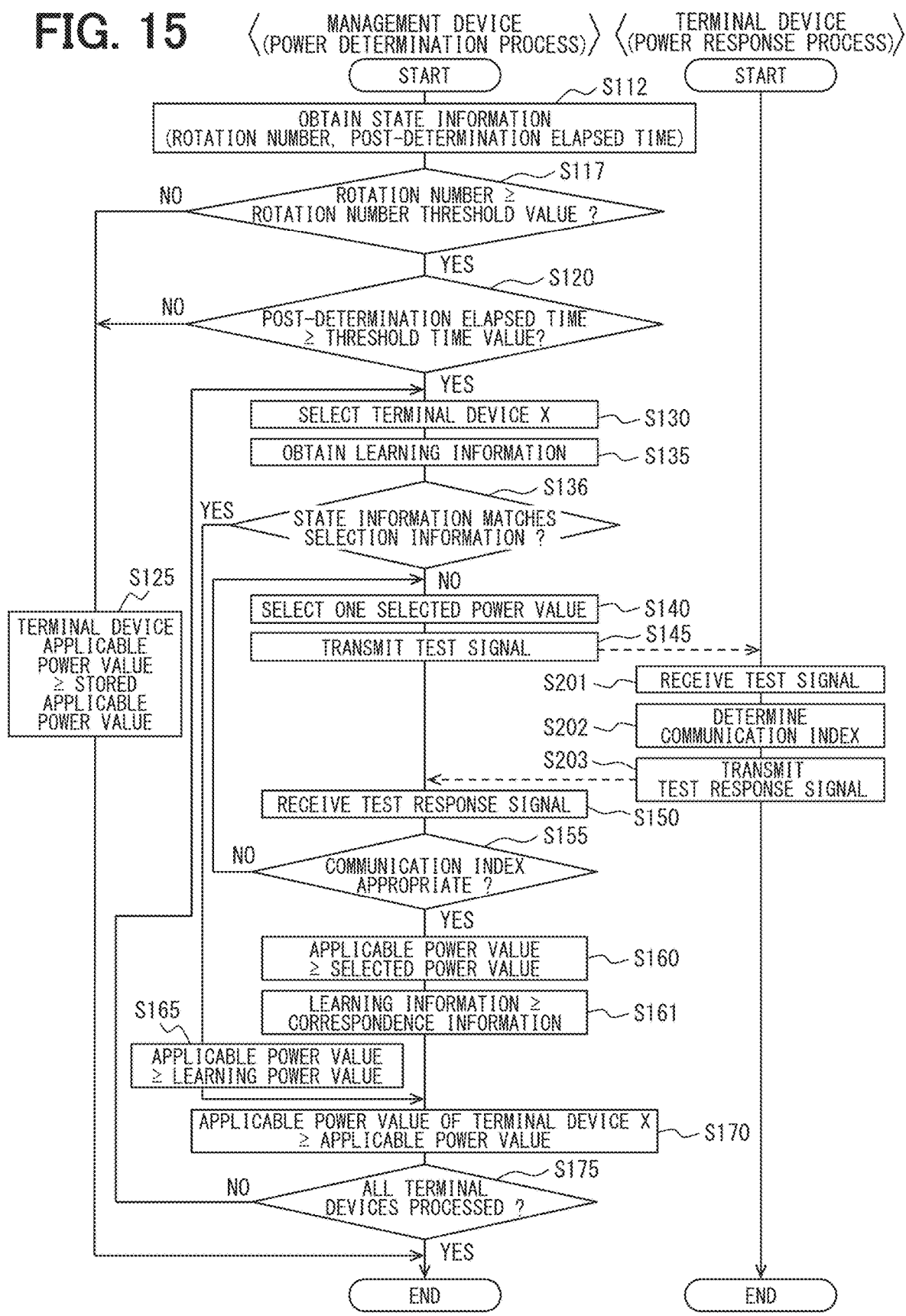
FIG. 15 is an explanatory diagram of an example of correspondence information in a third embodiment.

Third Embodiment, FIG. 15

3-1. Difference from Second Embodiment

The fundamental configuration of the third embodiment is similar to that of the second embodiment. Therefore, the difference therebetween is described in the following. Note that the same reference numerals as those in the second embodiment indicate the same configuration, and refer to the preceding descriptions.

In the above-described second embodiment, the acceleration of the vehicle V1 is used as the state information that quantitatively indicates the vibration of the housing 200. Then, when (i) the acceleration of the vehicle V1 becomes equal to or greater than the acceleration threshold value and (ii) the post-determination elapsed time is equal to or greater than the threshold time value, it is determined that the state of the housing 200 has changed.

On the other hand, the third embodiment is different from the second embodiment in that the rotation number of the inverter is used as the state information quantitatively indicating the vibration of the housing 200. Then, in connection with the above, the third embodiment is different from the second embodiment in that it is determined that the state of the housing 200 has changed when (i) the rotation number of the inverter becomes equal to or greater than a predetermined rotation number threshold value and (ii) the post-determination elapsed time becomes equal to or greater than the threshold time value.

3-2. Process

Next, the power determination process of the present embodiment, which is performed by the management control unit 23 of the third embodiment in place of performing the power determination process of the second embodiment (i.e., FIG. 10), is described using a flowchart of FIG. 15. Since the process of S125-S175 in FIG. 15 is similar to the process of S125-S175 in FIG. 10, a part of the description is simplified.

First, the management control unit 23 obtains the state information in S112. In the present embodiment, information indicating the magnitude of vibration of the housing 200 and the post-determination elapsed time are obtained as the state information. Specifically, as the information indicating the magnitude of vibration of the housing 200, the information indicating the rotation number of the inverter is obtained.

Subsequently in S117-S120, the management control unit 23 determines whether or not the state of the housing 200 has changed, based on the state information. In the present embodiment, when (i) the vibration of the housing 200 is relatively large and (ii) the post-determination elapsed time is long, it is determined that the state of the housing 200 has changed.

First, in S117, the management control unit 23 determines whether or not the vibration of the housing 200 is relatively large. Specifically, the management control unit 23 determines that the vibration of the housing 200 is relatively large when the rotation number of the inverter is equal to or greater than a predetermined rotation number threshold value. The management control unit 23 shifts the process to S125 when the rotation number of the inverter is less than the rotation number threshold value, and shifts the process to S120 when the rotation number is equal to or greater than the rotation number threshold value.

Subsequently in S120, the management control unit 23 obtains the post-determination elapsed time and determines whether the post-determination elapsed time is equal to or greater than the threshold time value. The management control unit 23 shifts the process to S125 when the post-determination elapsed time is less than the threshold time value, and shifts the process to the to S130 when the post-determination elapsed time is equal to or greater than the threshold time value.

In S125-S175, the management control unit 23 performs the same process as S125-S175 in FIG. 10.

3-3. Effects

According to the third embodiment described in details above, the effects (1a), (1d), (1g) of the first embodiment and the effects (2a)-(2c) of the second embodiment are achievable, together with the following effects.

(3a) The housing 200 may be mounted on the vehicle V1. The state information may be information indicating the rotation number of the inverter included in the vehicle V1. The power determination unit 61 may determine that the state of the housing 200 has changed when the rotation number of the inverter is equal to or greater than the rotation number threshold value which serves as the state threshold value. It is considered that the electromagnetic field intensity distribution in the housing 200 changes more greatly as the rotation number of the inverter increases. In the present embodiment, since the applicable power value is determined when the rotation number of the inverter relatively increases, it is possible to suppress the deterioration of the communication quality.

In the present embodiment, the management device 2 may be a variable device, and the terminal device 4 may be a target device. The management control unit 23 may be a power determination unit, a transmission instruction unit, a test transmission unit, a test determination unit, a state obtaining unit, a correspondence information obtaining unit, a correspondence determination unit, and a selection determination unit. S145 may be the process as a test transmission unit, and S160 may be the process as a test determination unit. S112 may be the process as a state obtaining unit, S135 may be the process as a correspondence information obtaining unit, S136 may be the process as a correspondence determination unit, and S165 may be the process as a selection determination unit.

3-4. Modifications

Modifications of the third embodiment are described in the following.

Figure 16:
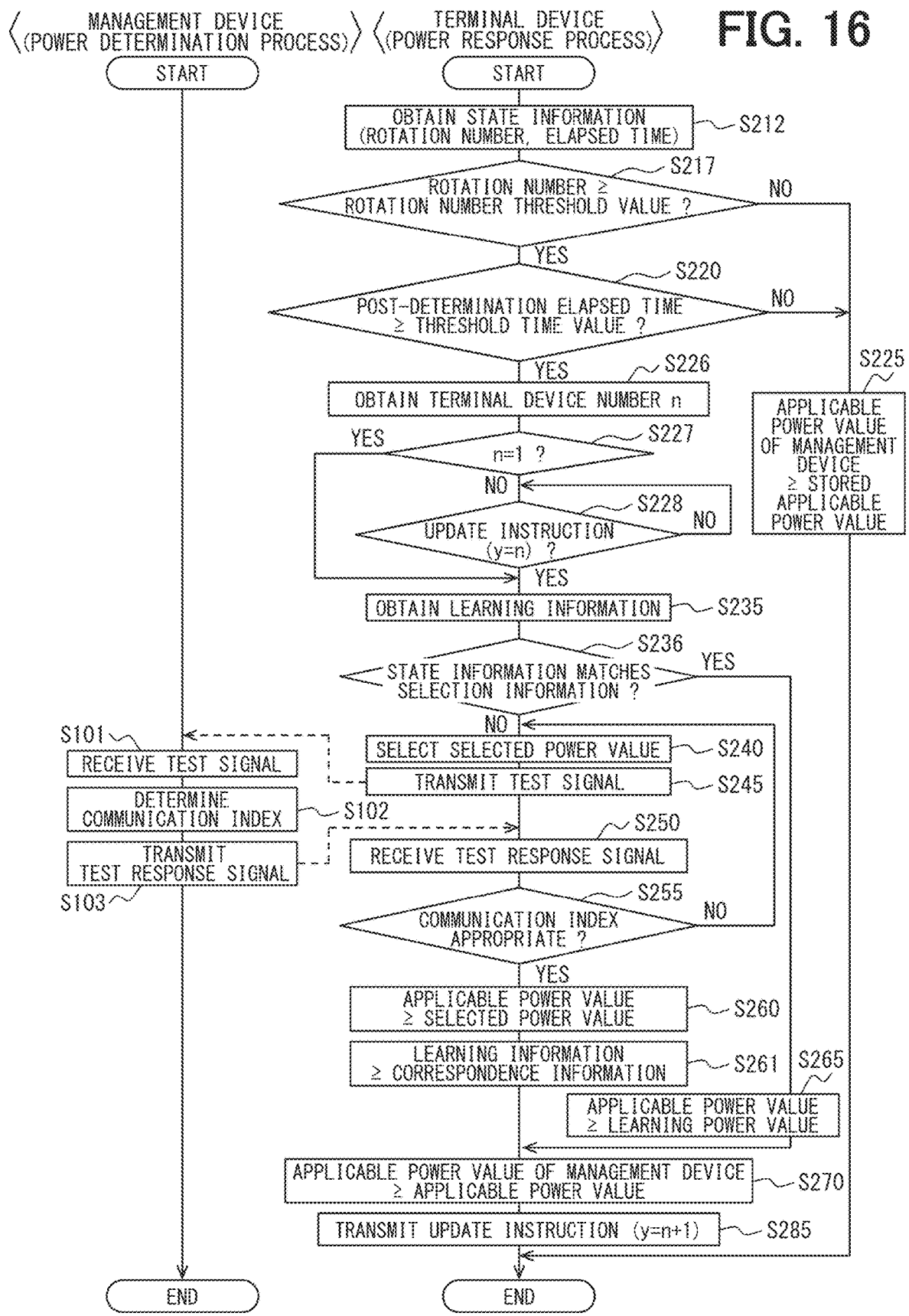
FIG. 16 is a flowchart of the power response process performed by the management control unit and the power determination process performed by the terminal control unit in a seventh modification.

<Seventh Modification, FIG. 16>

In a Seventh modification, as in the Fourth Modification described above, the management device 2 of the third embodiment may be a target device, and the terminal device 4 of the third embodiment may be a variable device. That is, the plurality of terminal devices 4 may be configured to sequentially, in/by turns, determine the transmission power value of the wireless communication signal to be transmitted to the management device 2 as the applicable power value based on the learning information.

However, the present modification is different from the Fourth Modification in that the rotation number of the inverter is used as the state information that quantitatively indicates the vibration of the housing 200. Then, in connection with such point, the present modification is different from the Fourth Modification in that it is determined that the state of the housing 200 has changed when (i) the rotation number of the inverter becomes equal to or greater than a predetermined rotation number threshold value, and (ii) the post-determination elapsed time becomes equal to or greater than a threshold time value.

For example, the terminal control unit 43 of the present modification may be configured to execute the power determination process shown in the flowchart of FIG. 16. In FIG. 16, S211 in FIG. 12 is replaced with S212, and S216 in FIG. 12 is replaced with S217.

Also in the present modification, the same effects as that of the third embodiment are achievable. This scheme is particularly effective when change in the state of the housing 200 influences the transmission characteristics of the wireless communication signal by the terminal device 4.

Note that in the present modification, the management device 2 may be a target device and the terminal device 4 may be a variable device. The terminal control unit 43 may be a power determination unit, a transmission instruction unit, a test transmission unit, a test determination unit, a state obtaining unit, a correspondence information obtaining unit, a correspondence determination unit, and a selection determination unit. S245 may be the process as a test transmission unit, and S260 may be the process as a test determination unit. S212 may be a process as a state obtaining unit, S235 may be a process as a correspondence information obtaining unit, S236 may be a process as a correspondence determination unit, and S265 may be a process as a selection determination unit.

Figure 17:
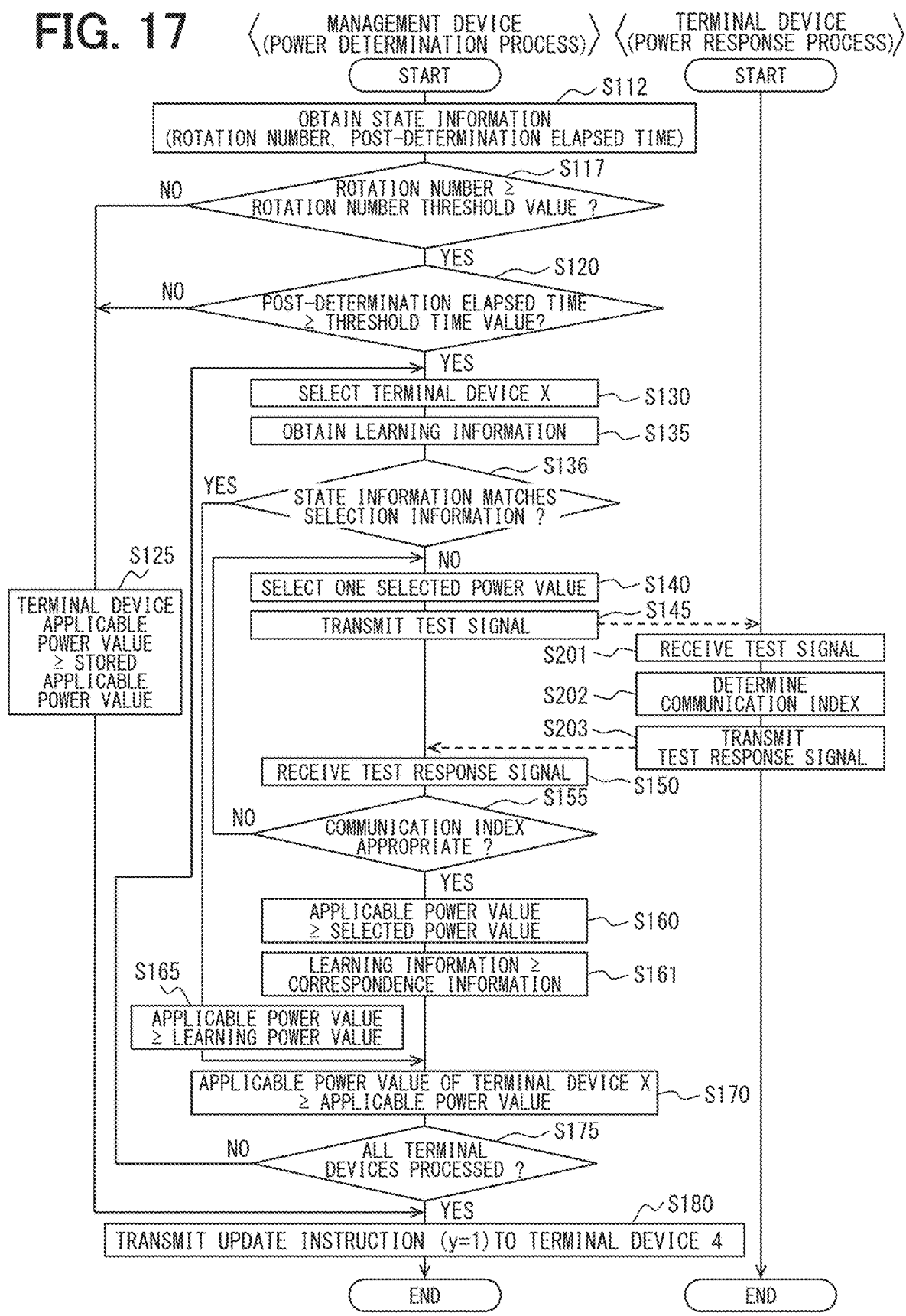
FIG. 17 is a flowchart of the power determination process performed by the management control unit and the power response process performed by a terminal control unit in an eighth modification.

<Eighth Modification, FIG. 17>

In an Eighth Modification, the third embodiment may be modified, just like the Fifth Modification described above, in that both of the following (i) and (ii) are possible, i.e., (i) the management device 2 is a variable device and the terminal device 4 is a target device, and (ii) the management device 2 is a target device and the terminal device 4 is a variable device. That is, the management device 2 may be configured to determine the transmission power value of the wireless communication signal to be transmitted to the terminal device 4 as the applicable power value based on the learning information, and the terminal device 4 may be configured to determine the transmission power value of the wireless communication signal to be transmitted to the management device 2 as the applicable power value.

However, the present modification is different from the Fifth Modification in that the rotation number of the inverter is used as the state information quantitatively indicating the vibration of the housing 200. Then, in connection with such point, the present modification is different from the Fifth Modification in that it is determined that the state of the housing 200 has changed when (i) the rotation number of the inverter becomes equal to or greater than a predetermined rotation number threshold value and (ii) the post-determination elapsed time becomes equal to or greater than the threshold time value.

Figure 18:
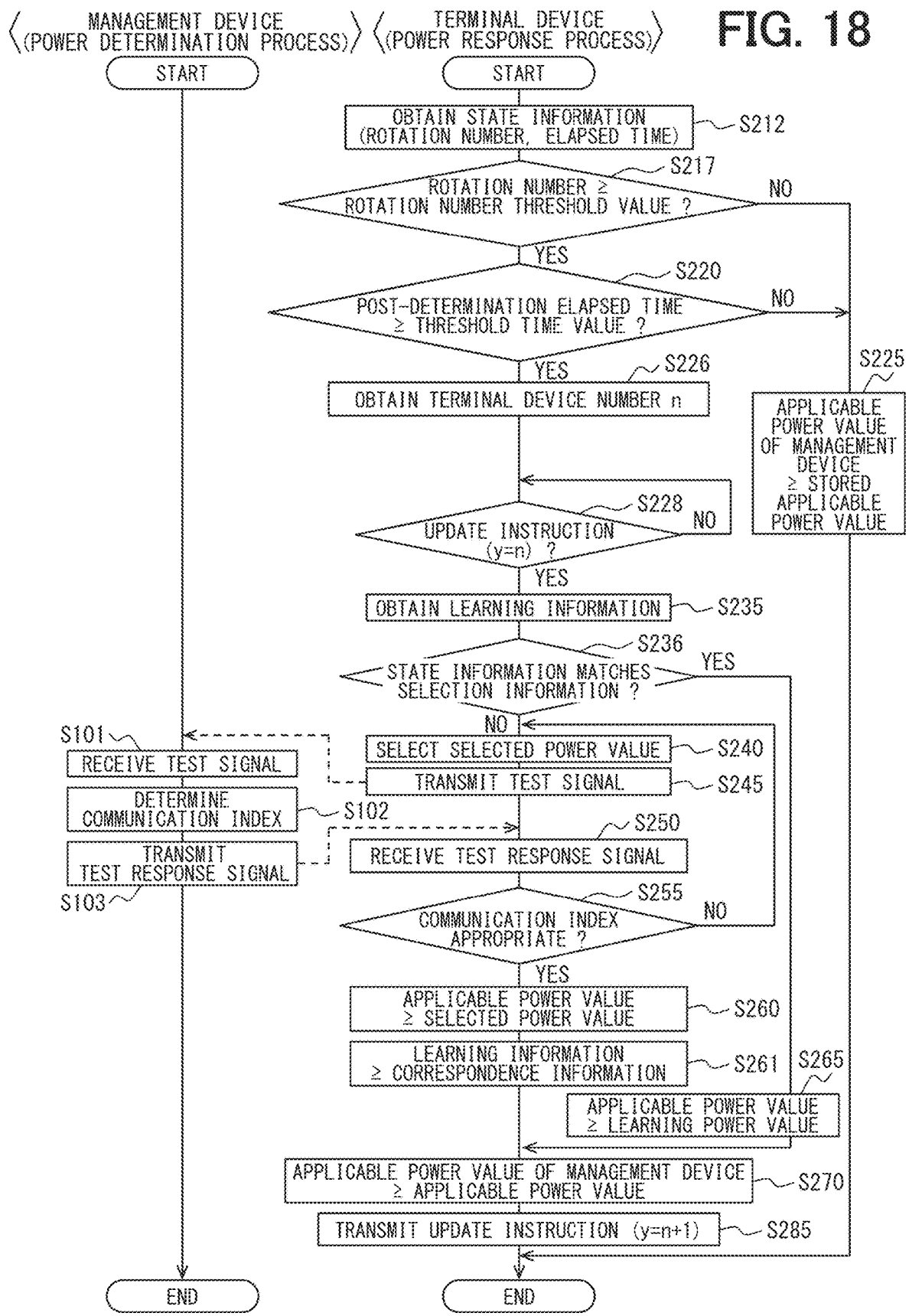
FIG. 18 is a flowchart of the power response process performed by the management control unit and the power determination process performed by the terminal control unit according to the eighth modification.

For example, the management control unit 23 of the present modification may be configured to execute the power determination process shown in FIG. 17. The power determination process shown in FIG. 17 is almost the same as the power determination process shown in FIG. 12. However, in FIG. 17, "acceleration" shown in FIG. 12 is replaced with "inverter rotation number", and an "acceleration threshold value" is replaced with a "rotation number threshold value." Further, for example, the terminal control unit 43 of the present modification may be configured to execute the power determination process shown in FIG. 18. The power determination process shown in FIG. 18 is almost the same as the power determination process shown in FIG. 14. However, in FIG. 18, "acceleration" shown in FIG. 14 is replaced with "inverter rotation number", and "acceleration threshold value" is replaced with "threshold time value".

Also in the present modification, the same effects as that of the third embodiment are achievable. This scheme is effective in particular when change of the state of the housing 200 influences the transmission characteristics of the wireless communication signal transmitted by both of the management device 2 and the terminal device 4.

<Ninth Modification, No Figure>

In the Eighth Modification, the management device 2 is configured to determine the applicable power value based on the learning information, and subsequently, the plurality of terminal devices 4 are configured to sequentially determine the applicable power value based on the learning information. However, the present disclosure is not limited to such configuration. In a Ninth Modification, the modification of the configuration may be that (i) the plurality of terminal devices 4 are configured to sequentially determine the applicable power value based on the learning information, and then (ii) the management device 2 is configured to determine the applicable power value based on the learning information.

In such case, the terminal device 4 may be configured to execute the power determination process shown in FIG. 18. Then, for example, when the communication system 100 includes m pieces of the terminal device 4, the m-th terminal device 4 may be configured to transmit the update instruction to the management device 2 instead of performing the process of S285 as a process subsequent to S270. For example, in the power determination process shown in FIG. 17, the management device 2 may wait until an update instruction is received after a positive determination is made in S120, and the process proceeds to S130 by a trigger when the update instruction is received, and the process of determining the applicable power value may then be started.

4. Other Embodiments

Although the embodiments of the present disclosure have been described above, the present disclosure is not limited to the embodiments described above, and various modifications can be made to implement the present disclosure.

(4a) In the power determination process, a selected power value when the communication quality is the best among the plurality of selected power values may be determined as the applicable power value. The best communication quality includes, for example, a situation in which the BER takes the smallest value.

(4b) The test signal may be a wireless communication signal for causing at least the reception intensity of the test signal to be transmitted to the target device. For example, the target device may measure a reception intensity of the received wireless communication signal (i.e., the test signal), and may transmit the wireless communication signal (i.e., the test response signal) indicating the reception information including the reception intensity to the variable device. That is, the above-described test response signal needs to only include the reception intensity of the test signal, and needs not include the BER determination result.

Figure 19:
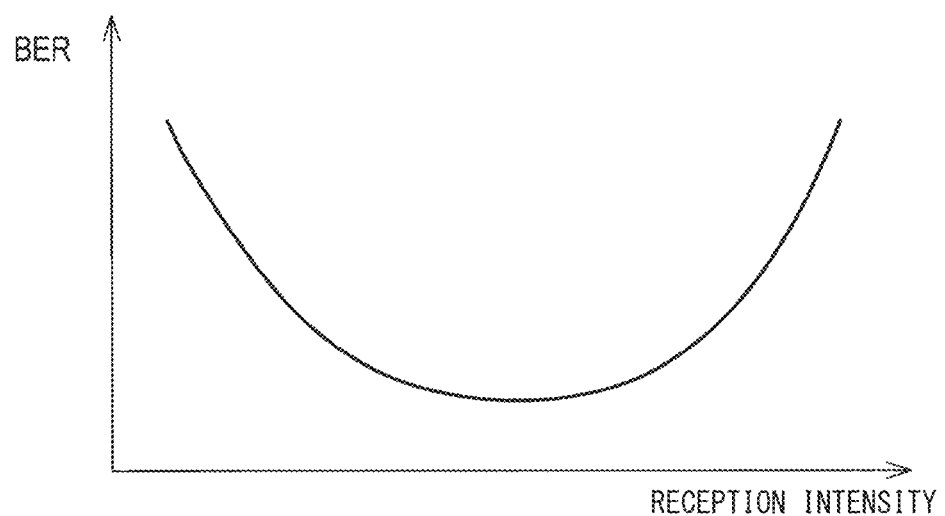
FIG. 19 is a diagram of a correspondence relationship between reception intensity and BER in other embodiments.

The variable device may be configured to identify the BER corresponding to the reception intensity transmitted from the target device, based on a correspondence relationship between (i) a plurality of predetermined reception intensities and (ii) BERs obtained in advance by experiments or the like as shown in FIG. 19, for example. The information indicating the correspondence relationship may be stored in the memory included in the variable device. In such manner, it is possible to reduce the process load for the BER determination in the target device.

(4c) For example, in the above-described embodiments, the variable device is configured to determine whether or not the state of the housing 200 has changed based on the two pieces of the state information in the power determination process. However, the present disclosure is not limited to such scheme. The variable device may be configured to determine whether the state of the housing 200 has changed based on the at least one piece of the state information in the power determination process.

That is, in the power determination process, the variable device may determine whether or not the state of the housing 200 has changed based on one piece of the state information, or may determine the same based on plural pieces of (i.e., three or more pieces of) the state information. Also, a plurality of power determination processes that determine the applicable power value based on different state information may be performed in parallel.

(4d) For example, as shown in FIG. 20, a communication system 101 may include one management device 2 and a plurality of terminal devices 4, and the plurality of terminal devices 4 may respectively form plural groups each of which includes at least one terminal device 4. Then, the management device 2 may be configured to perform wireless communication with the terminal device(s) 4 in the respective groups by using respectively different frequency bands. For example, in FIG. 20, the plurality of groups includes a first group a and a second group b. The management device 2 and the terminal device 4 included in the first group a may perform wireless communication in the first frequency band F1, and the management device 2 and the terminal device 4 included in the second group b may perform wireless communication in the second frequency band F2.

In such case, when transmitting the test signal in the power determination process, the variable device may transmit the wireless communication signal in the frequency band used by the terminal device 4 which serves as a target device at the selected power value, for a determination of the applicable power value. The information indicating the correspondence between the identification numbers of the respective terminal devices 4 and the frequency bands used by the respective terminal device 4s is stored in advance in the memory provided in the variable device.

Thereby, even when the communication system 101 communicates with the terminal device 4 using a plurality of frequency bands, the same effects as that of the above-described embodiments are achievable.

(4e) In the above-described embodiments, the communication system 100 is mounted on the vehicle V1, but the present disclosure is not limited to such scheme. For example, the communication system 100 may be mounted/used in various devices other than the vehicle V1, or may be used in connection with various devices.

(4f) The management control unit 23, the terminal control unit 43, and the method thereof according to the present disclosure may be realized by a dedicated computer configured by a processor and a memory programmed to perform one or more functions embodied by a computer program.

Alternatively, the management control unit 23, the terminal control unit 43, and the method thereof described in the present disclosure may be realized by a dedicated computer configured by a processor having one or more dedicated hardware logic circuits.

Alternatively, the management control unit 23, the terminal control unit 43, and the method thereof described in the present disclosure may be realized by one or more dedicated computers provided as a combination of (i) the processor and the memory programmed to perform one or more functions embodied by a computer program and (ii) the processor having one or more hardware logic circuits.

Further, the computer program may be stored in a computer-readable, non-transitory, tangible storage medium as instructions to be performed by such computer.

The method for realizing the functions of the respective units included in the management control unit 23 and the terminal control unit 43 does not necessarily have to include software, and all the functions may be realized by using one or more hardware devices.

(4g) Plural functions of one element in the above-described embodiments may be realized by plural elements or one function of one element may be realized by plural constituent elements. In addition, plural functions of plural elements may be realized by one element, or a single function realized by plural elements may be realized by one element. Moreover, part of the configuration of the above-mentioned embodiments may be omitted/dropped. Further, at least part of the configuration of one of the above-described embodiments may be added to or replaced with the configuration of the other of the above-described embodiments.

(4h) In addition to the management control unit 23, the terminal control unit 43, the CPU 26, the CPU 46, the management device 2, the terminal device 4, the battery module 3, the communication system 100, and the communication system 101 described above, the present disclosure may also be implemented in various forms such as a program for operating the management control unit 23 and the terminal control unit 43 to function, a non-transitory, substantive recording medium such as a semiconductor memory recording such program, a communication method realizing the above and the like.

What is claimed is:

1. A communication system comprising:
at least one management device that performs wireless communication, and
a plurality of terminal devices that respectively obtain information about at least one battery and respectively and wirelessly communicate with at least one management device, wherein
a variable device, which is one of the management device and a terminal device, wherein the terminal device is one of the plurality of terminal devices, and wherein the variable device includes:
a power determination unit configured to:
  (i) obtain at least one state information indicating a state of a housing including the communication system,
  (ii) determine whether the state of the housing is changed based on the obtained state information,
  (iii) determine the state of the housing, and, upon determining that a change has occurred in the state of the housing, determine a transmission power value of a wireless communication signal to be transmitted to a target device, which is other of the management device and the terminal device and with which the variable device communicates, as an applicable power value that achieves a predetermined communication quality; and
a transmission instruction unit configured to instruct a wireless communication device provided in the variable device to transmit the wireless communication signal to the target device at the applicable power value.

2. The communication system according to claim 1, wherein
the state information is information indicating a predetermined specific state, and
the power determination unit is configured to determine that the state of the housing has changed when at least the state information is information indicating the specific state.

3. The communication system according to claim 2, wherein
the housing is mounted on a vehicle,
the state information is information indicating, as the specific state, a state in which an ignition switch of the vehicle is turned ON, and
the power determination unit determines that the state of the housing has changed, at least when the ignition switch of the vehicle is in the specific state.

4. The communication system according to claim 1, wherein
the state information is information quantitatively indicating a state of the housing, and
the power determination unit determines whether the state of the housing has changed based at least on a comparison between the state information and a predetermined state threshold value.

5. The communication system according to claim 4, wherein
the state information is information quantitatively indicating vibration of the housing.

6. The communication system according to claim 5, wherein
the housing is mounted on a vehicle,
the state information is acceleration of the vehicle, and
the power determination unit determines that the state of the housing has changed when at least the acceleration of the vehicle is equal to or greater than an acceleration threshold value that indicates, as the state threshold value, a predetermined acceleration of the vehicle.

7. The communication system according to claim 5, wherein
the housing is mounted on a vehicle,
the state information is a rotation number of an inverter included in the vehicle, and
the power determination unit determines that the state of the housing has changed when at least the rotation number of the inverter is equal to or greater than a rotation number threshold that indicates the predetermined rotation number of the inverter, which is the state threshold value.

8. The communication system according to claim 4, wherein
the state information is an elapsed time after a most recent determination of the applicable power value, and
the power determination unit determines that the state of the housing has changed when at least the elapsed time is equal to or greater than a threshold time value indicative of a predetermined time as the state threshold value.

9. The communication system according to claim 4, wherein
the power determination unit includes:
a test transmission unit configured to transmit, when a predetermined execution condition is satisfied, a test signal sequentially at predetermined plural selected power values to the target device that generates a communication index quantitatively indicative of the communication quality of the received test signal according to the test signal received thereby and transmits reception information including at least the communication index, and
a test determination unit configured to obtain the communication index included in the reception information transmitted from the target device, and to determine the selected power value when the communication index is within a predetermined range as the applicable power value.

10. The communication system according to claim 9, wherein
the power determination unit further includes:
a state obtaining unit configured to obtain the state information;
a correspondence information obtaining unit configured to obtain at least one set of learning information including setting information that is the state information indicating a predetermined numerical value and a learning power value that is a predetermined power value associated with the setting information;
a correspondence determination unit configured to determine whether or not the obtained state information is included within a predetermined range including the selection information which is one of the setting information included in the learning information when it is determined that the state of the housing has been changed; and
a selection determination unit configured to determine the learning power value associated with the selection information as the applicable power value when the obtained state information is within the predetermined range including the selection information, and wherein
the test transmission unit transmits the test signal when the obtained state information is NOT within the predetermined range including the selection information based on the execution condition that the obtained state information is NOT within the predetermined range including the selection information, and the test determination unit determines the applicable power value.

11. A management device for a communication system of a vehicle, the management device comprising:
a processor;
a memory;
a wireless communicator; and
an antenna,
wherein the communication system includes the management device and a first terminal device,
wherein the memory is a non-transitory computer-readable medium including instructions that, when executed by the processor, cause a power management process including:
obtain state information including: an acceleration, and a post-determination elapsed time;
determine that the acceleration is ≥an acceleration threshold value;
determine that the post-determination elapsed time is ≥a threshold time value;
select the first terminal device;
obtain first learning information;
determine that state information does not match selection information;
select a first selected power value;
transmit a first test signal using the first selected power value;
receive a first test response signal;
determine that a communication index, of the received first test response signal, is appropriate;

determine that the selected power value is an applicable power value for communicating with the first terminal device; and generate new correspondence information based on the applicable power value for communicating with the first terminal device, and add the new correspondence information to stored learning information.

* * * * *